(12) United States Patent
Wilenski et al.

(10) Patent No.: US 9,162,915 B1
(45) Date of Patent: Oct. 20, 2015

(54) PANEL ASSEMBLY HAVING THIN BONDLINE WITH REDUCED EDGE STRESS

(75) Inventors: Mark S. Wilenski, Mercer Island, WA (US); Daniel C. Stanley, Renton, WA (US); Michael P. Kozar, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 819 days.

(21) Appl. No.: 13/285,632

(22) Filed: Oct. 31, 2011

(51) Int. Cl.
*B32B 1/04* (2006.01)
*B32B 3/02* (2006.01)
*B32B 7/12* (2006.01)
*B32B 9/04* (2006.01)
*B32B 38/10* (2006.01)
*B32B 17/06* (2006.01)
(Continued)

(52) U.S. Cl.
CPC . *C03B 21/02* (2013.01); *B26D 3/02* (2013.01); *B26D 3/065* (2013.01); *B32B 1/04* (2013.01); *B32B 3/02* (2013.01); *B32B 7/12* (2013.01); *B32B 9/04* (2013.01); *B32B 17/00* (2013.01); *B32B 17/06* (2013.01); *B32B 38/10* (2013.01); *B32B 38/105* (2013.01); *C03C 19/00* (2013.01); *C03C 23/00* (2013.01); *C03C 27/00* (2013.01); *Y10T 156/1059* (2015.01); *Y10T 156/1062* (2015.01); *Y10T 156/1074* (2015.01); *Y10T 156/1075* (2015.01)

(58) Field of Classification Search
CPC .. B32B 9/005; B32B 9/007; B32B 2038/006; B32B 2038/105; B32B 2571/02; B32B 1/04; B32B 3/02; B32B 7/12; B32B 9/04; B32B 17/06; B32B 17/00; B32B 38/105; B32B 38/10; B32B 2037/1253; B32B 2037/1246; F41H 1/02; C03B 21/02; C03C 19/00; C03C 23/00; C03C 27/00; Y10T 156/1059; Y10T 156/1074; Y10T 156/1062; Y10T 156/1075; Y10T 156/14; B26D 3/02; B26D 3/065
USPC ................ 156/254, 256, 257, 263, 268, 106; 144/346, 355, 377; 52/783.1, 796.1; 428/192
See application file for complete search history.

(56) References Cited

U.S. PATENT DOCUMENTS 2,092,789 A * 9/1937 Tillyer ............................ 156/99
8,182,638 B2 * 5/2012 Weber et al. .................. 156/257

FOREIGN PATENT DOCUMENTS

WO    WO 2008/082201 A1 * 7/2008 .............. B23B 37/10

OTHER PUBLICATIONS

U.S. Appl. No. 12/901,342, Transparent Composites With Organic Fiber, filed Oct. 8, 2010.
U.S. Appl. No. 12/968,514, Controlled Fiber-Matrix Adhesion in Polymer Fiber Composites, filed Dec. 15, 2010.
U.S. Appl. No. 12/968,535, Fibers With Interlocking Shapes, filed on Dec. 15, 2010.
(Continued)

*Primary Examiner* — Linda L Gray

(57) ABSTRACT

A structure may include a first layer, a second layer, and an adhesive layer. The first layer may have a faying surface, a side edge, and a first coefficient of thermal expansion. The second layer may also have a faying surface, a side edge, and a second coefficient of thermal expansion that is different than the first coefficient of thermal expansion. The adhesive layer may be interposed between the first and second faying surfaces. The faying surface of at least one of the first and second layers may include an edge treatment extending along at least a portion of a respective one of the side edges. The edge treatment may have an edge treatment length measured along a direction generally parallel to the faying surface and an edge treatment height measured along a direction generally perpendicular to the faying surface.

23 Claims, 23 Drawing Sheets

(51) Int. Cl.
  *C03B 21/02* (2006.01)
  *C03C 3/06* (2006.01)
  *B26D 3/06* (2006.01)
  *C03C 19/00* (2006.01)
  *B32B 17/00* (2006.01)
  *B32B 38/00* (2006.01)
  *B26D 3/02* (2006.01)
  *C03C 23/00* (2006.01)
  *C03C 27/00* (2006.01)

(56) References Cited

OTHER PUBLICATIONS

U.S. Appl. No. 12/968,557, Optimized Fiber Shapes for Improved Optical Performance, filed on Dec. 15, 2010.
U.S. Appl. No. 12/969,532, Sandwiched Fiber Composites for Ballistic Applications, filed on Dec. 15, 2010.
U.S. Appl. No. 12/968,575, Selectively Coupled Fibers in Composites, filed on Dec. 15, 2010.

* cited by examiner

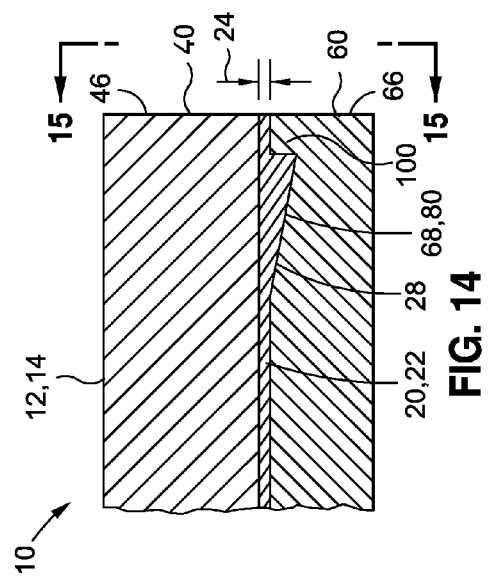
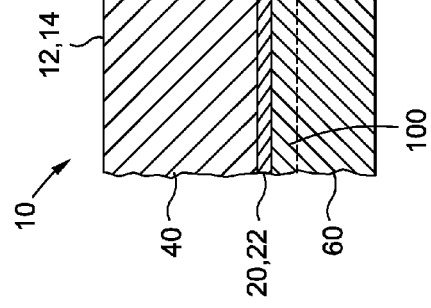
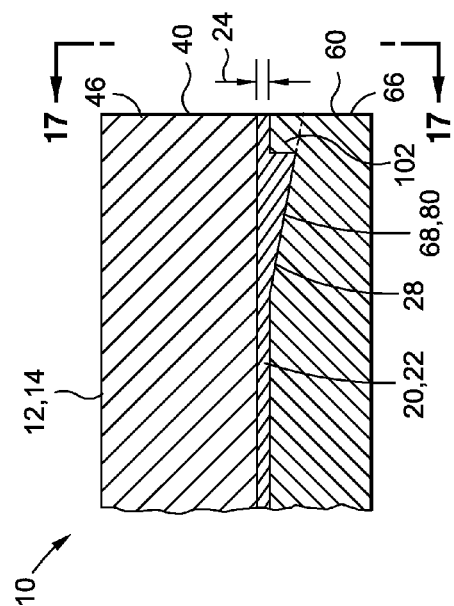
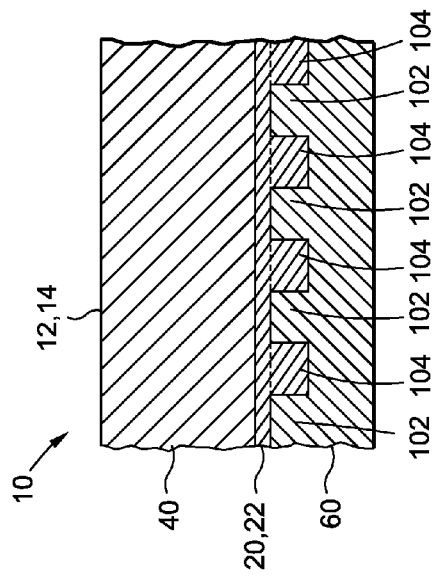

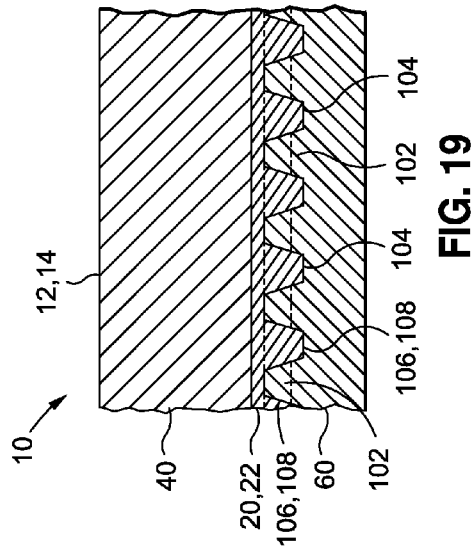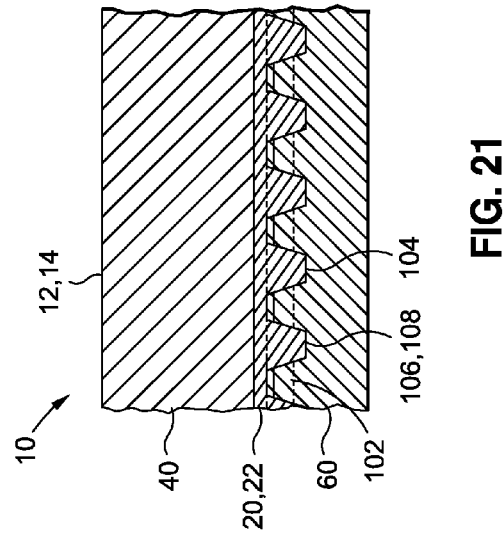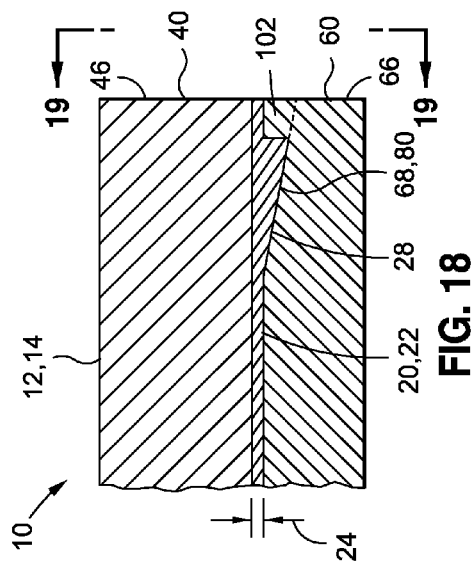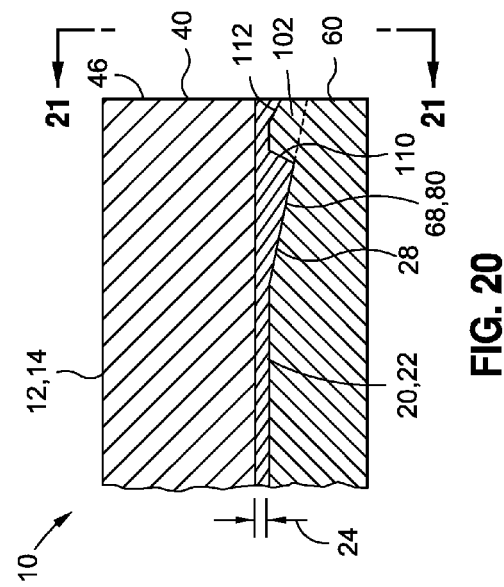

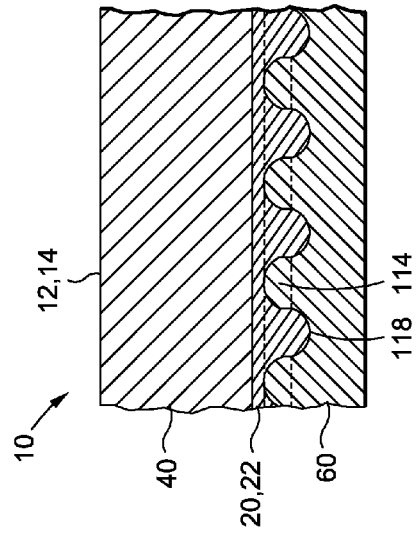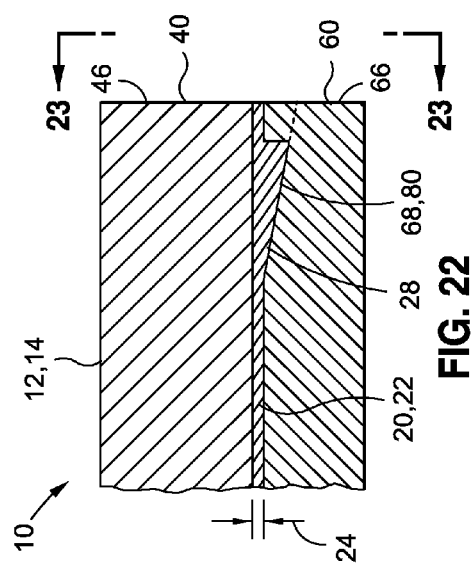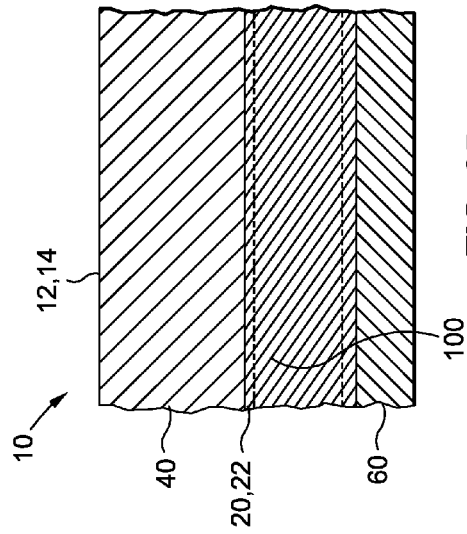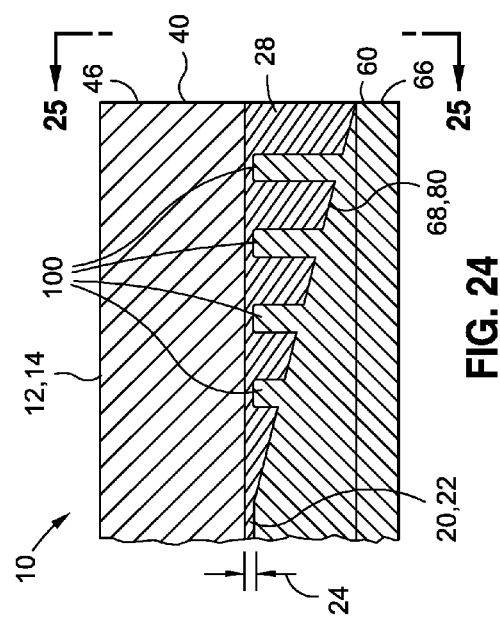

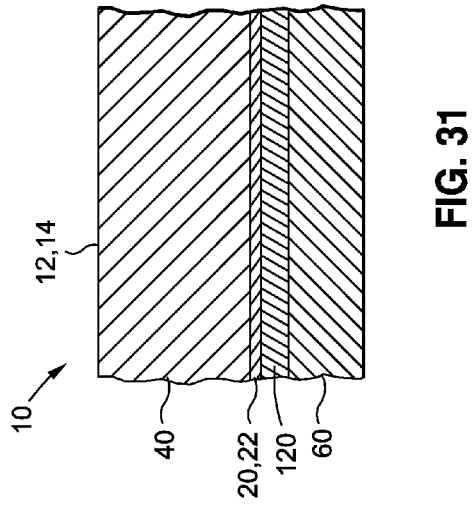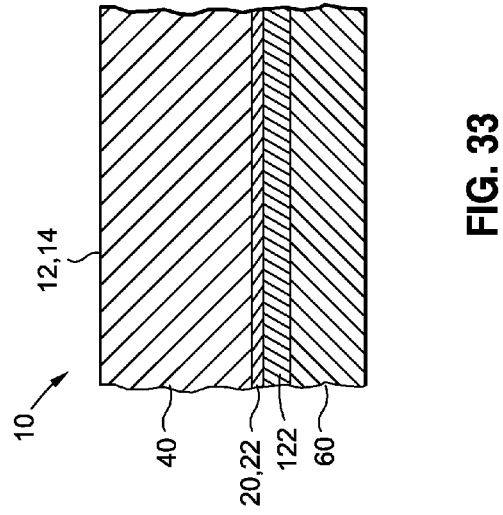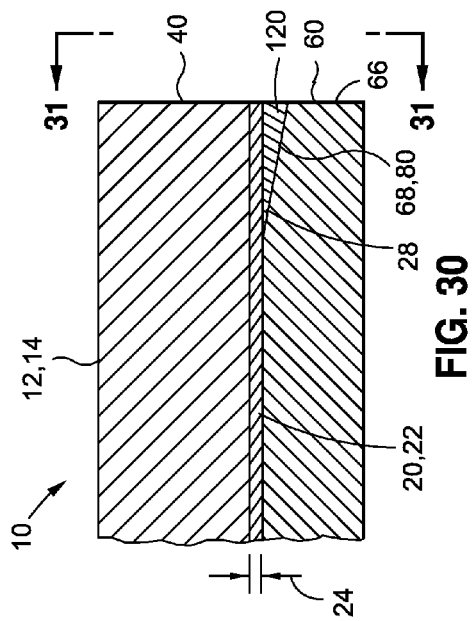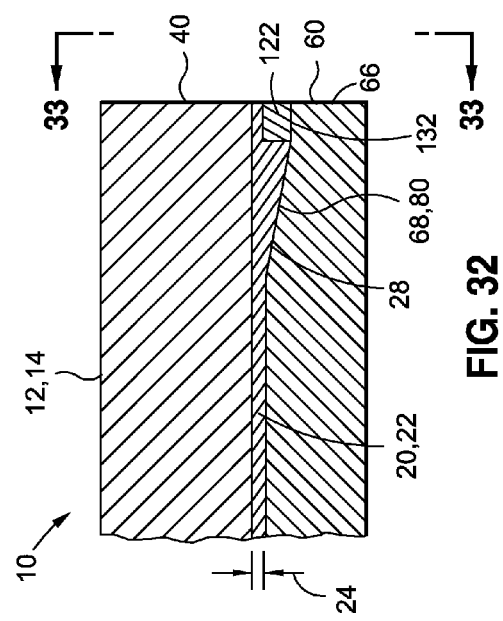

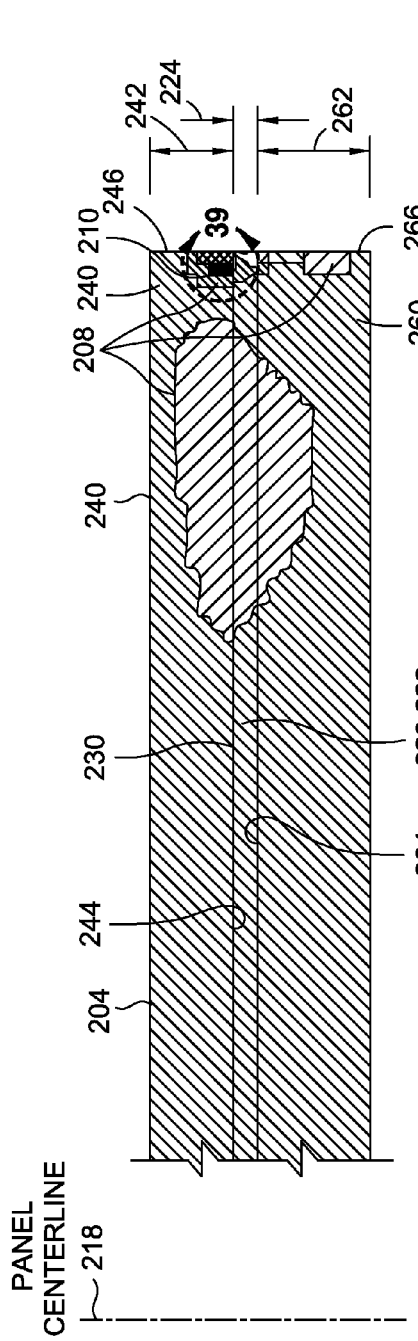
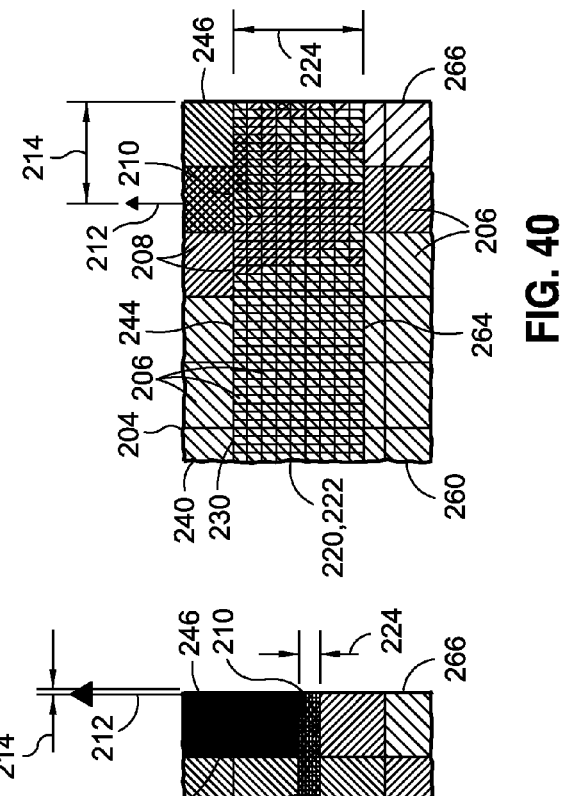
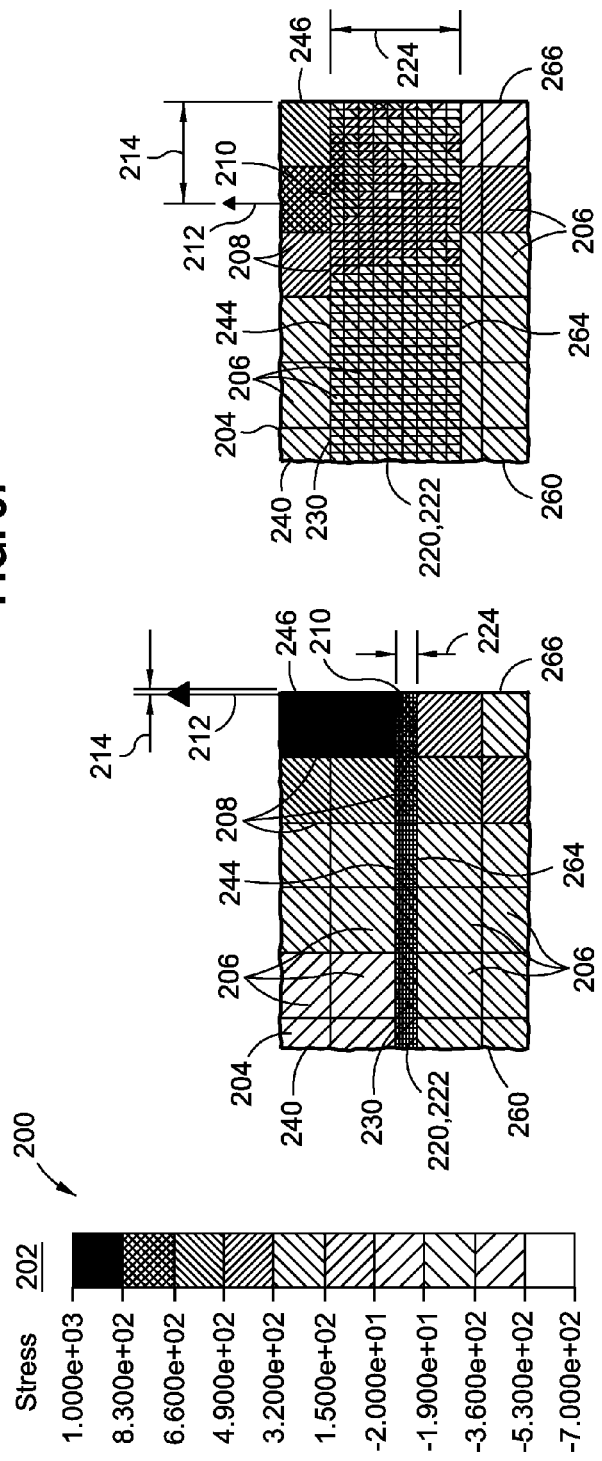
FIG. 37
FIG. 38
FIG. 39
FIG. 40

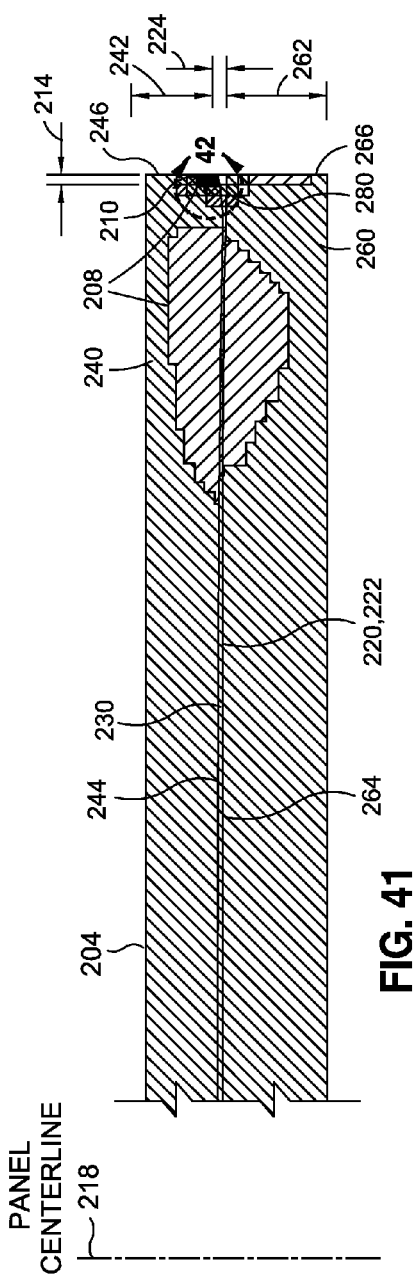
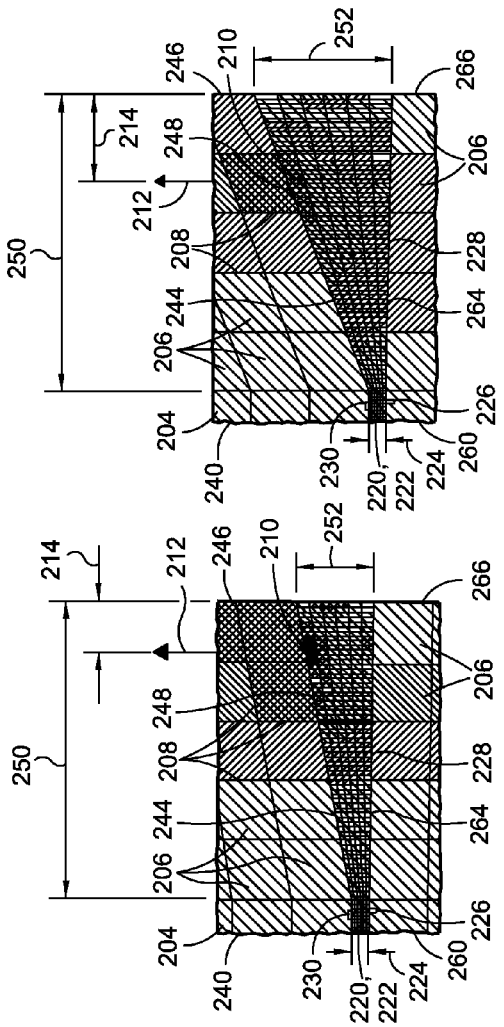
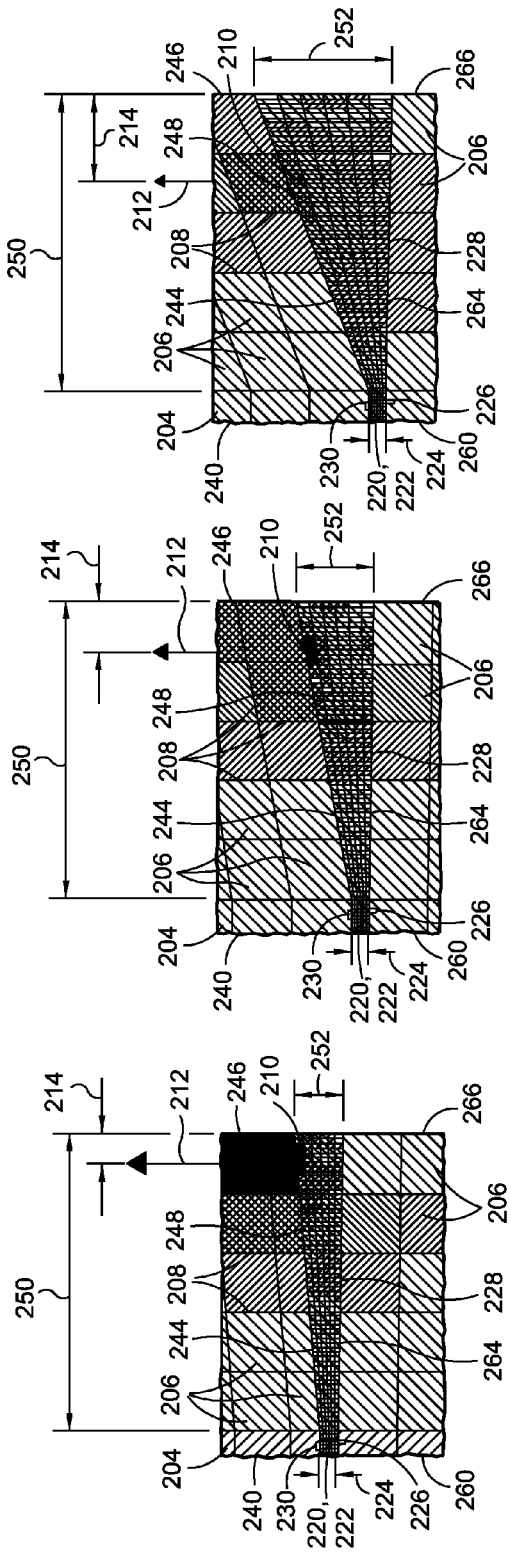

| RUN NO. | GLASS THICKNESS (in) | GLASS CTE (in/in/°F) | PC THICKNESS (in) | PC CTE (in/in/°F) | BONDLINE THICKNESS (in) bth | GLASS CHAMFER HEIGHT (in) gh | GLASS CHAMFER LENGTH (in) gl | PC CHAMFER HEIGHT (in) pch | PC CHAMFER LENGTH (in) pcl | NORMALIZED MAXIMUM STRESS |
|---|---|---|---|---|---|---|---|---|---|---|
| 1 | 0.354 | 1.83E-06 | 0.500 | 3.61E-05 | 0.100 | 0.000 | 0.000 | 0.000 | 0.000 | 0.00 |
| 2 | 0.354 | 1.83E-06 | 0.500 | 3.61E-05 | 0.050 | 0.000 | 0.000 | 0.000 | 0.000 | 0.11 |
| 3 | 0.354 | 1.83E-06 | 0.500 | 3.61E-05 | 0.025 | 0.000 | 0.000 | 0.000 | 0.000 | 0.23 |
| 4 | 0.354 | 1.83E-06 | 0.500 | 3.61E-05 | 0.015 | 0.000 | 0.000 | 0.000 | 0.000 | 0.27 |
| 5 | 0.354 | 1.83E-06 | 0.500 | 3.61E-05 | 0.008 | 0.000 | 0.000 | 0.000 | 0.000 | 0.33 |
| 6 | 0.354 | 1.83E-06 | 0.500 | 3.61E-05 | 0.015 | 0.025 | 0.250 | 0.000 | 0.000 | 0.14 |
| 7 | 0.354 | 1.83E-06 | 0.500 | 3.61E-05 | 0.015 | 0.050 | 0.250 | 0.000 | 0.000 | 0.11 |
| 8 | 0.354 | 1.83E-06 | 0.500 | 3.61E-05 | 0.015 | 0.100 | 0.375 | 0.000 | 0.000 | -0.03 |
| 9 | 0.354 | 1.83E-06 | 0.500 | 3.61E-05 | 0.015 | 0.050 | 0.500 | 0.000 | 0.000 | 0.10 |
| 10 | 0.354 | 1.83E-06 | 0.500 | 3.61E-05 | 0.015 | 0.000 | 0.000 | 0.050 | 0.500 | 0.10 |
| 11 | 0.354 | 1.83E-06 | 0.500 | 3.61E-05 | 0.015 | 0.000 | 0.000 | 0.100 | 0.500 | 0.05 |
| 12 | 0.354 | 1.83E-06 | 0.500 | 3.61E-05 | 0.015 | 0.050 | 0.500 | 0.050 | 0.000 | -0.12 |
| 13 | 0.354 | 1.83E-06 | 0.500 | 3.61E-05 | 0.015 | 0.050 | 0.500 | 0.000 | 0.500 | -0.11 |
| 14 | 0.354 | 1.83E-06 | 0.500 | 3.61E-05 | 0.025 | 0.050 | 0.000 | 0.050 | 0.000 | 0.10 |
| 15 | 0.354 | 1.83E-06 | 0.500 | 3.61E-05 | 0.025 | 0.050 | 0.000 | 0.000 | 0.500 | -0.09 |
| 16 | 0.354 | 1.83E-06 | 0.500 | 3.61E-05 | 0.015 | 0.000 | 0.000 | 0.200 | 0.000 | 0.16 |
| 17 | 0.354 | 1.83E-06 | 0.500 | 3.61E-05 | 0.015 | 0.000 | 0.000 | 0.050 | 0.250 | 0.31 |
| 18 | 0.354 | 1.83E-06 | 0.500 | 3.61E-05 | 0.015 | 0.000 | 0.000 | 0.050 | 0.125 | 0.12 |
| 19 | 0.354 | 1.83E-06 | 0.500 | 3.61E-05 | 0.015 | 0.000 | 0.000 | 0.250 | 1.250 | 0.12 |
| 20 | 0.354 | 1.83E-06 | 0.500 | 3.61E-05 | 0.015 | 0.000 | 0.000 | 0.450 | 2.250 | -0.33 |

PANEL ASSEMBLY HAVING THIN BONDLINE WITH REDUCED EDGE STRESS

STATEMENT RE: FEDERALLY SPONSORED RESEARCH/DEVELOPMENT

This invention was made with Government support under Agreement No. W911W6-10-2-0005 awarded by U.S. Army Aviation Applied Technology Directorate (AATD). The Government has certain rights in this invention.

FIELD

The present disclosure relates generally to composites and, more particularly, to a composite panel assembly comprised at least two layers bonded together and having reduced residual stress along a bondline between the layers.

BACKGROUND

Transparent armor panels may be comprised of multiple layers formed of different materials. For example, an armor panel may include an outer layer or strike face formed of glass, ceramic, or glass-ceramic material configured to receive an impact from a projectile. The ballistic performance of the armor panel may be improved by adding one or more layers to the backside of the strike face. For example, one or more layers of polycarbonate, polyurethane, polymethylmethacrylate (PMMA), or other material may be adhesively bonded to the backside of the glass layer (e.g., strike face) to improve the energy-absorbing capability of the armor panel.

Unfortunately, the bonding of the glass layer to the polycarbonate (or other) layer may induce the formation of residual stress in the panel assembly. The residual stress in the panel assembly may be caused by a difference in the coefficient of thermal expansion of the glass layer relative to the coefficient of thermal expansion of the polycarbonate layer. The residual stress may be induced in the panel assembly as a result of bonding the glass layer to the polycarbonate layer at a relatively high temperature (e.g., 180°-250° Fahrenheit) and then allowing the bonded panel assembly to cool to room temperature.

The residual stress may include tensile stress acting at the bondline of the panel assembly along one or more side edges of the panel assembly. The tensile stress along the side edges may result in a peel force located at the side edge and which may urge the glass layer and polycarbonate layer to peel away from one another at the bondline. Over time, such peel forces may result in delaminations in the bondline between the glass layer and the polycarbonate layer. Such delaminations may reduce the mechanical, ballistic, and optical performance of the panel assembly in the field.

Prior art attempts to reduce residual stress in composite panel assemblies include increasing the overall bondline thickness. Although generally effective in reducing residual stress between the layers of the panel assembly, the increase in bondline thickness unfortunately reduces the ballistic performance of the panel assembly. Furthermore, the increase in bondline thickness adds weight to the panel assembly which reduces the overall performance of the system (e.g., a vehicle or a structure) to which the panel assembly is mounted.

As can be seen, there exists a need in the art for a system and method for reducing residual stress in panel assemblies formed of materials having different coefficients of thermal expansion. Ideally, such system and method for reducing residual stress in panel assemblies is of simple construction, low cost, and lightweight.

BRIEF SUMMARY

The above-noted needs associated with residual stress in panel assemblies are specifically addressed and alleviated by the present disclosure which, in an embodiment, provides a structure having a first layer, a second layer, and an adhesive layer. The second layer may optionally be comprised of a plurality of layers. The first layer may have a faying surface, a side edge, and a first coefficient of thermal expansion. The second layer may also have a faying surface, a side edge, and a second coefficient of thermal expansion that is different than the first coefficient of thermal expansion. The adhesive layer may be interposed between the first and second faying surfaces. The faying surface of at least one of the first and second layers may include an edge treatment extending along at least a portion of a respective one of the side edges. The edge treatment may have an edge treatment length measured along a direction generally parallel to the faying surface and an edge treatment height measured along a direction generally perpendicular to the faying surface.

In a further embodiment, disclosed is a structure comprising a substantially optically transparent first layer and a substantially optically transparent second layer. Each one of the first and second layers may have a faying surface, a side edge, and a coefficient of thermal expansion. The coefficient of thermal expansion of the first layer may be different than the coefficient of thermal expansion of the second layer. The structure may include an adhesive layer interposed between the faying surfaces of the first and second layer. The faying surface of at least one of the first and second layers may be chamfered along at least a portion of the respective side edge.

In a further embodiment, disposed is a method of forming a structure having reduced residual stress. The method may include the step of providing a first layer having a faying surface, a side edge, and a first coefficient of thermal expansion. The method may further include providing a second layer having a faying surface, a side edge, and a second coefficient of thermal expansion that may be different than the first coefficient of thermal expansion. The method may additionally include forming an edge treatment in the faying surface of at least one of the first and second layers along at least a portion of the side edge thereof. The method may further include bonding the faying surface of the first layer to the faying surface of the second layer using an adhesive layer.

The features, functions, and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 14 is a cross-sectional illustration of a panel assembly in an embodiment wherein the edge treatment of the second layer includes a chamfer having a rib spacer extending upwardly from the chamfer;

FIG. 15 is an end view of the panel assembly of FIG. 14 taken along line 15 and illustrating the rib spacer extending continuously along a direction generally parallel to a length of the side edge of the panel assembly;

FIG. 16 is a cross-sectional illustration of a panel assembly in an embodiment wherein the edge treatment of the second layer includes a chamfer having a plurality of block spacers extending upwardly from the chamfer;

FIG. 17 is an end view of the panel assembly of FIG. 16 taken along line 17 and illustrating the plurality of block spacers extending along the side edge of the panel assembly;

FIG. 18 is a cross-sectional illustration of a panel assembly in a further embodiment wherein the block spacers have tapered sides;

FIG. 19 is an end view of the panel assembly of FIG. 18 taken along line 19 and illustrating the tapered sides of the block spacers;

FIG. 20 is a cross-sectional illustration of a panel assembly in a further embodiment wherein the block spacers have tapered backs and chamfers on the exterior facing sides;

FIG. 21 is an end view of the panel assembly of FIG. 20 taken along line 21 and illustrating the tapered block spacers having tapered backs and chamfers;

FIG. 22 is a cross-sectional illustration of a panel assembly in a further embodiment having spacers arranged in a sinusoidal pattern;

FIG. 23 is an end view of the panel assembly of FIG. 22 taken along line 23 and illustrating the sinusoidal pattern of the spacers;

FIG. 24 is a cross-sectional illustration of a panel assembly in an embodiment wherein the edge treatment of the second layer includes a chamfer having plurality of rib spacers arranged in spaced relationship to one another along an inward direction from the side edge;

FIG. 25 is an end view of the panel assembly of FIG. 24 taken along line 25 and illustrating the outermost rib spacer extending continuously along at least a portion of the side edge;

FIG. 30 is a cross-sectional illustration of a panel assembly in an embodiment having a wedge strip spacer provided as a separate component from the first layer and the second layer and being mounted therebetween;

FIG. 31 is an end view of the panel assembly of FIG. 30 taken along line 31 and illustrating the wedge strip spacer mounted between the first layer and the second layer;

FIG. 32 is a cross-sectional illustration of a panel assembly in an embodiment having a separate flat strip spacer mounted between the first layer and a flat formed on the chamfer of the second layer;

FIG. 33 is an end view of the panel assembly of FIG. 32 taken along line 33 and illustrating the flat strip spacer mounted between the first layer and the flat of the chamfer of the second layer;

FIG. 37 is an illustration of a thermal modeling solution of a panel assembly comprised of a glass upper layer and a polycarbonate lower layer bonded together with a polyurethane adhesive layer and illustrating the distribution of residual stress in the panel assembly as a result of a mismatch in the coefficient of thermal expansion of the glass layer and the polycarbonate layer;

FIG. 38 is a stress contour legend and the corresponding stress magnitudes for the thermal modeling solution of the panel assembly illustrated in FIGS. 37 and 39-44;

FIG. 39 is an enlarged view of a portion of the thermal modeling solution of the panel assembly taken along line 39 of FIG. 37 and illustrating a relatively thin (i.e., 0.015 inch), constant-thickness bondline and a relatively high magnitude residual stress (i.e., tensile stress) at the glass-adhesive interface along the side edge of the panel assembly;

FIG. 40 is an enlarged view of a thermal modeling solution of a panel assembly having a relatively thick (i.e., 0.100 inch) constant-thickness bondline and a decreased magnitude residual stress at the glass-adhesive interface located at an increased distance from the side edge relative to the location of the relatively high magnitude residual stress illustrated in FIG. 39;

FIG. 41 is an illustration of a thermal modeling solution of a panel assembly wherein the faying surface of the glass layer (i.e., the upper layer) includes an edge treatment comprised of a chamfer formed along the side edge;

FIG. 42 is an enlarged view of the thermal modeling solution of the panel assembly taken along line 17 of FIG. 41 and illustrating the chamfer formed in the glass layer and the location of maximum stress (i.e., tensile stress) at an increased distance from the side edge relative to the location of maximum stress in the constant-thickness bondline of the panel assembly of FIG. 39;

FIG. 43 is an enlarged view of the thermal modeling solution of a panel assembly wherein the chamfer in the glass layer has an increased chamfer height relative to the chamfer height of FIG. 42 and illustrating a reduction in the magnitude of maximum tensile stress located at an increased distance from the side edge relative to the location of maximum tensile stress in the panel assembly of FIG. 42;

FIG. 44 is an enlarged view of the thermal modeling solution of a panel assembly wherein the chamfer in the glass layer has an increased chamfer height relative to the chamfer height of FIG. 43 and illustrating a reduction in the magnitude of maximum tensile stress located at an increased distance from the side edge relative to the location of maximum tensile stress in the panel assembly of FIG. 43;

DETAILED DESCRIPTION

Figure 1:
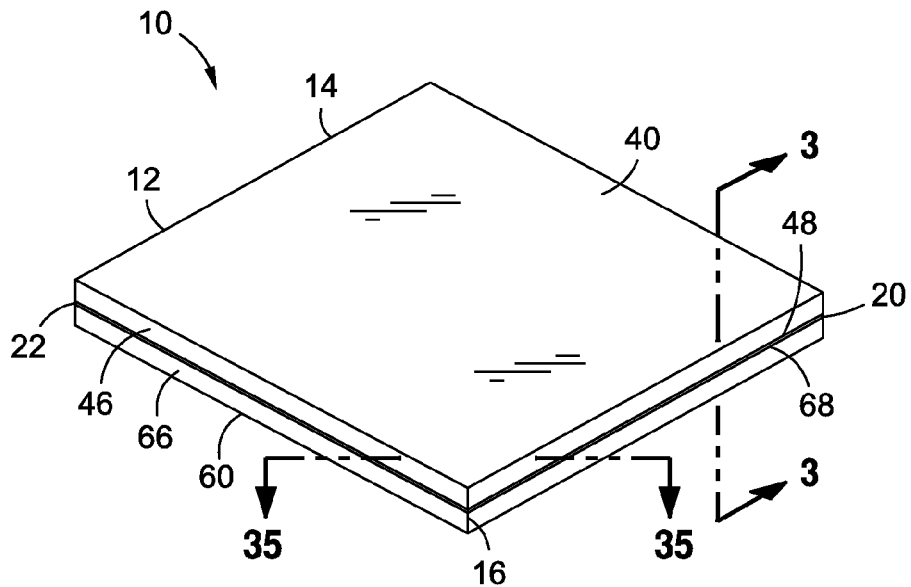
FIG. 1 is a perspective illustration of a panel assembly comprising a first layer and a second layer having different coefficients of thermal expansion and being bonded together with an adhesive layer.

Referring now to the drawings wherein the showings are for purposes of illustrating preferred and various embodiments of the disclosure, shown in FIG. 1 is a structure 10 configured as a generally planar panel assembly 12 which may comprise a substantially optically transparent armor panel 14. Although shown as a panel assembly 12 having two generally planar layers 40, 60 with generally straight side edges 46, 66, the structure 10 may be provided in more than two layers and may be configured in any one of a variety of different shapes and sizes. For example, the structure 10 may include layers with compound curvature surfaces (not shown) and is not necessarily limited to a planar shape. Furthermore, the structure 10 may include layers having non-straight or curved side edges (not shown). Although described as a substantially optically transparent armor panel 14, the structure 10 may be provided in any one of a variety of different configurations for use in any one of a variety of different applications, without limitation, including substantially opaque panel configurations.

Figure 2:
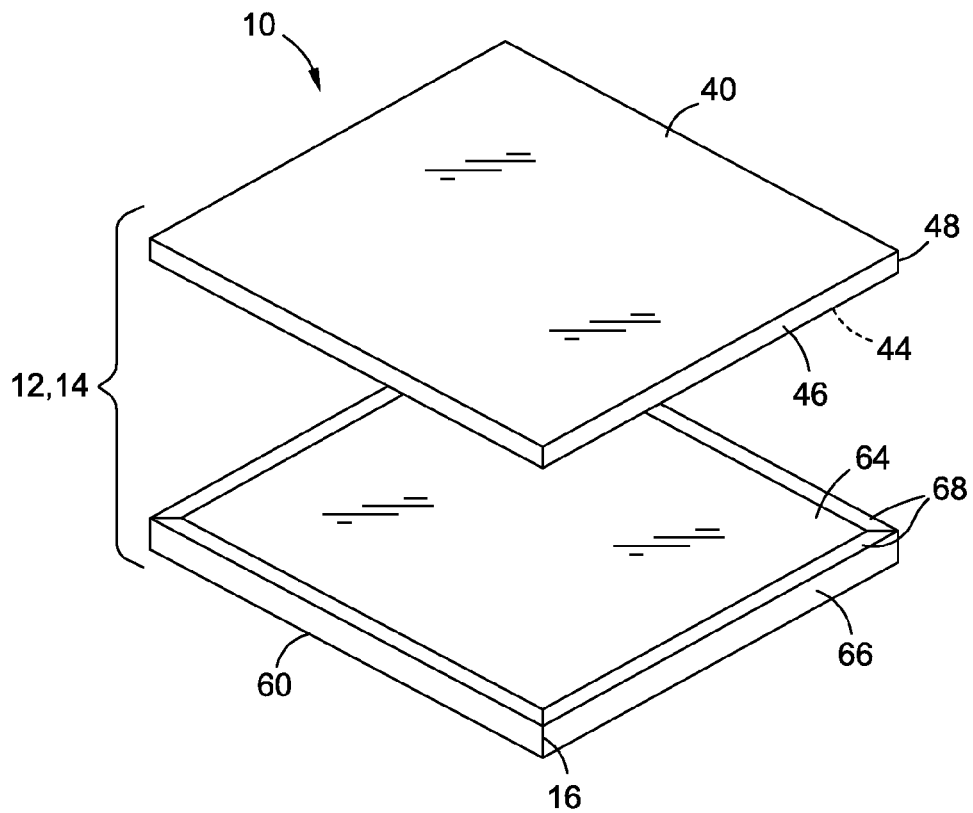
FIG. 2 is an exploded perspective illustration of the panel assembly of FIG. 1 omitting the adhesive layer and illustrating edge treatments formed as chamfers extending along the side edges of the first and second layers.

In FIG. 1, the structure 10 may include a first layer 40 and a second layer 60. Each one of the first and second layers 40, 60 may include a faying surface 44, 64 (FIG. 2). The faying surface 44 of the first layer 40 and the second layer 60 may be generally parallel to one another and may be bonded together by an adhesive layer 20 that may be interposed between the first layer 40 and the second layer 60. In an embodiment, the first layer 40 may have a first coefficient of thermal expansion. The second layer 60 may have a second coefficient of thermal expansion that may be different than the first coefficient of thermal expansion.

As shown in the exploded view of FIG. 2, the first layer 40 and/or the second layer 60 may advantageously include an edge treatment 48, 68 that may extend along at least a portion of at least one of the side edges 46, 66 of the first layer 40 and/or the second layer 60. For example, the edge treatment 48, 68 may comprise a chamfer 80 (FIG. 2) that may extend along at least a portion of at least one of the side edges 46, 66. The edge treatment 68 (e.g., chamfer 80) may be formed in the faying surface 64 of the second layer 60 and may extend along one or more of the side edges 66 of the second layer 60. Although not shown in FIG. 2, the edge treatment 48, 68 48 (e.g., chamfer 80) may also be formed in the faying surface 44 of the first layer 40 and may extend along one or more of the side edges 46 of the first layer 40.

Advantageously, the edge treatment 48, 68 as described herein is configured to minimize or reduce stress concentrations that may otherwise occur along the side edges 46, 66 of the layers 40, 60 of the panel assembly 12 at the bondline 22 between the layers 40, 60. For example, in the panel assembly 12 illustrated in FIG. 1, the edge treatment 48, 68 of the first layer 40 and/or the second layer 60 may be effective in reducing the magnitude of residual stress at the interface between the adhesive layer 20 and the first layer 40 and/or at the interface between the adhesive layer 20 and the second layer 60. In this regard, the edge treatment 48, 68 may reduce the magnitude of tensile stress (e.g., tensile stress 212 in FIG. 39) oriented generally perpendicular to the faying surface and may thereby reduce a peel force that may otherwise urge the first layer 40 and second layer 60 apart from one another at the side edges 46, 66. The edge treatment 48, 68 may also limit, reduce, or prevent fractures near stress concentrations (not shown) in one or both of the layers 40, 60. For example, the edge treatment 48, 68 may reduce glass fractures (not shown) near stress concentrations in a glass layer (not shown).

As mentioned above, residual stress in the panel assembly 12 may be thermally induced due to a difference in the coefficient of thermal expansion of the first layer 40 relative to the coefficient of thermal expansion of the second layer 60. The thermally induced residual stress may be a result of the assembly process for bonding the first layer 40 to the second layer 60 using the adhesive layer 20 between the first and second layer 40, 60. For example, residual stress may be induced in the panel assembly 12 as a result of bonding the first layer 40 to the second layer 60 at an elevated temperature (e.g., 180°-250° Fahrenheit) to promote curing of the adhesive layer 20. At the elevated temperature when the first and second layer 40, 60 are initially placed in contact with one another at the adhesive layer 20, the panel assembly 12 may be generally free of thermally induced residual stress. However, after curing or consolidating the adhesive layer 20 at the elevated temperature, the first layer 40 and the second layer 60 may be allowed to cool to room temperature. Because the first and second layers 40, 60 are unable to freely contract relative to one another while cooling, the difference in coefficient of thermal expansion of the first layer 40 relative to the second layer 60 may induce the formation of residual stress in the panel assembly 12. Changes in temperature during use of the assembled panel may also generate thermally induced stress in the panel assembly 12 due to the difference in coefficient of thermal expansion of the first layer 40 relative to the second layer 60.

With regard to thermally induced stress resulting from the process of bonding the first layer to the second layer, residual stress may be reduced or minimized by using a room-temperature curable adhesive (not shown) in the bondline between the first layer and the second layer instead of bonding the first and second layers together using adhesive that requires curing at elevated temperatures (e.g., 180°-250° Fahrenheit). In this regard, the adhesive layer for bonding the first layer to the second layer may be selected to have a curing temperature that is approximately within the temperature range of the operating environment of the panel assembly and is not limited to a room-temperature curing adhesive. Further in this regard, thermally induced stress in the panel assembly may also be reduced or minimized by selecting materials from which the first and second layer are formed which minimize the difference in the coefficient of thermal expansion of the materials over the manufacturing temperatures and/or over the operating temperatures of the panel assembly. By selecting materials that minimize the difference in coefficient of thermal expansion between the first layer and second layer in combination with providing the first layer and/or second layer with an edge treatment, thermally induces stresses may be minimized.

Referring briefly to FIG. 39 illustrating a panel assembly thermal modeling solution, for a constant thickness bondline 222 with no edge treatment, the residual stress 212 may have a relatively large magnitude along the side edges 246, 266 of the layers 240, 260 of the panel assembly 204 relative to the magnitude of residual stress at interior portions of the panel assembly 204. Advantageously, by including an edge treatment 248, 268 in the faying surfaces 244, 264 along one or more side edges 246, 266, the magnitude of such stress concentrations may be minimized as shown in FIGS. 17-19. Furthermore, by including an edge treatment 248, 268 (FIG. 42) along one or more of the side edges 246, 266 of the first and/or second layer 240, 260, the location of maximum stress 210, 212 may be moved inboard (FIGS. 17-19) from the side edges 246, 266 instead of a location of maximum stress 210, 212 generally at (FIG. 39) the side edges 246, 266. The inboard location (FIGS. 17-19) of maximum stress 210, 212 may effectively reduce, minimize, or eliminate peel forces (not shown) that may otherwise occur at the side edges 246, 266.

Figure 3:
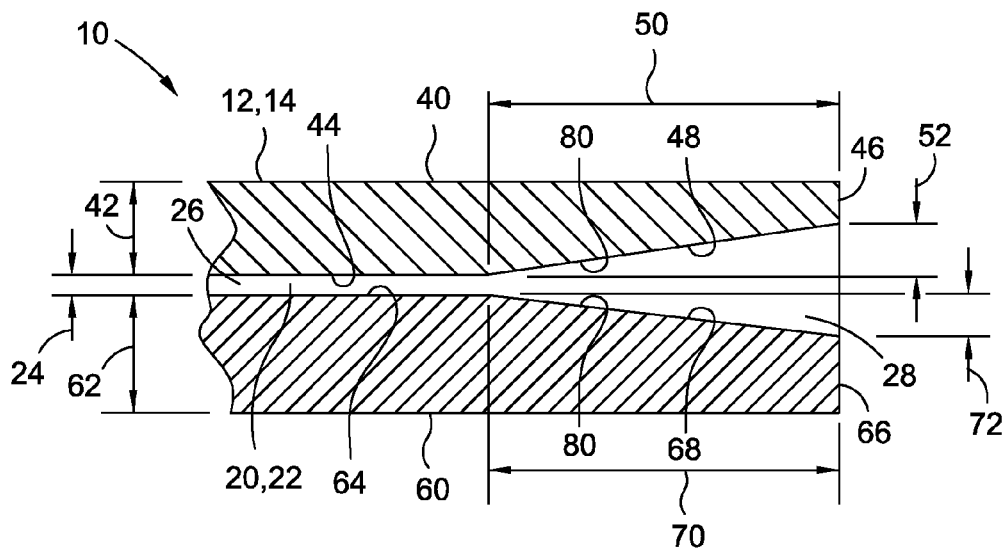
FIG. 3 is a cross-sectional illustration of the panel assembly taken along line 3 of FIG. 1 and illustrating the first and second layers each having an edge treatment (e.g., a chamfers)

Referring to FIG. 3, shown is an embodiment of the panel assembly 12 including the first layer 40 and the second layer 60 respectively formed at a first layer thickness 42 and a second layer thickness 62 and bonded by an adhesive layer 20. In FIG. 3-9, the first layer 40 and second layer 60 are shown with cross-hatching. Cross-hatching is omitted from the adhesive layer 20 in FIGS. 3-9 for clarity in showing the dimension lines of the edge treatment 48,68.

As was indicated above, the first and second layers 40, 60 may have an edge treatment 48, 68 that may extend along the side edges 46, 66 of the respective first and second layers 40, 60. In the embodiment shown in FIG. 3, the edge treatment 48, 68 comprises a bevel or a chamfer 80. The edge treatment 48, 68 may have an edge treatment length 50, 70 that may extend along a direction generally parallel to the faying surface of the layer in which it is formed. In addition, the edge treatment 48, 68 may include an edge treatment height 52, 72 that may extend along a direction generally perpendicular to the faying surface as shown in FIG. 3.

In FIG. 3, the edge treatment length 50 of the first layer 40 may be measured from the side edge 46 of the first layer 40 along a direction generally parallel to the plane of the faying surface 44 of the first layer 40. Likewise, the edge treatment length 70 of the second layer 60 may be measured from the side edge 66 of the second layer 60 inboard along a direction generally parallel to the plane of the faying surface 64 of the second layer 60. The edge treatment height 52 of the first layer 40 may be measured along a direction generally perpendicular to the planar surface of the first layer 40. Likewise, the edge treatment height 72 of the second layer 60 may be measured along a direction generally perpendicular to the faying surface 64 of the second layer 60 as shown in FIG. 3.

The adhesive layer 20 may substantially fill the gap between the first layer 40 and the second layer 60 in the area of the edge treatment 48, 68 and in the area between the faying surfaces 44, 64 of the first and second layer 40, 60. In this regard, the adhesive layer 20 may define a bondline 22 between the first layer 40 and the second layer 60. The bondline 22 may have a main portion 26 and an edge treatment portion 28. The edge treatment portion 28 of the bondline 22 may comprise the portion of the adhesive layer 20 between the edge treatment(s) 48, 68 of the first and/or second layer 40, 60. The main portion 26 of the bondline 22 may comprise the portion of the adhesive layer 20 extending inboard from the edge treatment portion 28 between the faying surfaces 44, 64 of the first and second layers 40, 60. The composition of the adhesive layer 20 in the main portion 26 of the bondline 22 may be the same composition as the adhesive layer 20 in the edge treatment portion 28 of the bondline 22. However, it is contemplated that the main portion 26 of the bondline 22 may include a different adhesive layer 20 material than the adhesive layer 20 material in the edge treatment portion 28 of the bondline 22.

In an embodiment, the bondline 22 in the main portion 26 may have a thickness 24 that is preferably less than approximately 0.100 inch. In a further embodiment, the bondline 22 may optionally be provided with a thickness 24 in the main portion 226 of approximately 0.050 inch. However, the bondline 22 may have a thickness 24 in the main portion 26 of any size including a thickness 24 that exceeds approximately 0.100 inch. However, by maintaining the thickness 24 of the bondline 22 in the main portion 26 to approximately 0.100 inch or less, the performance of the panel assembly 12 may be improved. For example, by maintaining the thickness 24 of the main portion 26 of the bondline 22 to approximately 0.100 inch or less, ballistic performance of the panel assembly 12 may be improved and weight of the panel assembly 12 may be minimized.

Referring still to FIG. 3, the edge treatment 48, 68 may have an aspect ratio that may be defined as the ratio of the edge treatment length 50, 70 to the edge treatment height 52, 72. In an embodiment, the edge treatment 48, 68 of the first layer 40 and/or the second layer 60 may be formed at an aspect ratio of no less than approximately 1. However, the edge treatment 48, 68 may be formed at an aspect ratio of greater than 1. By maintaining the edge treatment 48, 68 aspect ratio at a value of no less than approximately 1, stress concentrations along the side edge of the first layer 40 and/or second layer 60 may be minimized as will be described in later detail below. It should also be noted that although the edge treatments 48, 68 in the first and second layer 40, 60 of FIG. 3 are illustrated as having generally similar aspect ratios, the panel assembly 12 may be configured such that the aspect ratio of the edge treatment 48 in the first layer 40 may be different than the aspect ratio of the edge treatment 68 in the second layer 60.

Figure 4:
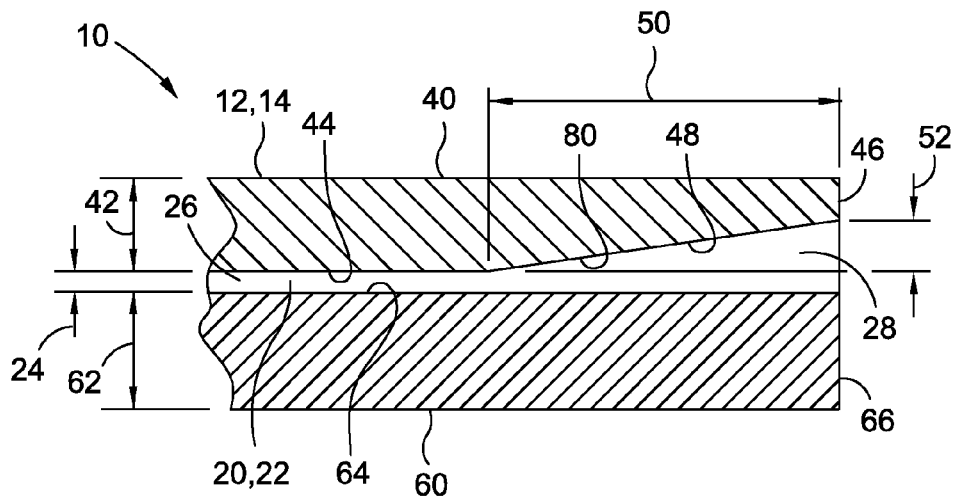
FIG. 4 is a cross-sectional illustration of a panel assembly in an alternative embodiment wherein the second layer is formed without an edge treatment.

Referring to FIG. 4, shown is an embodiment of the panel assembly 12 wherein the side edge 46 of the first layer 40 includes an edge treatment 48 or chamfer 80 and the side edge 66 of the second layer 60 is devoid or lacking of an edge treatment 68. Such an arrangement may minimize cost by eliminating the need for forming an edge treatment in the second layer 60.

Figure 5:
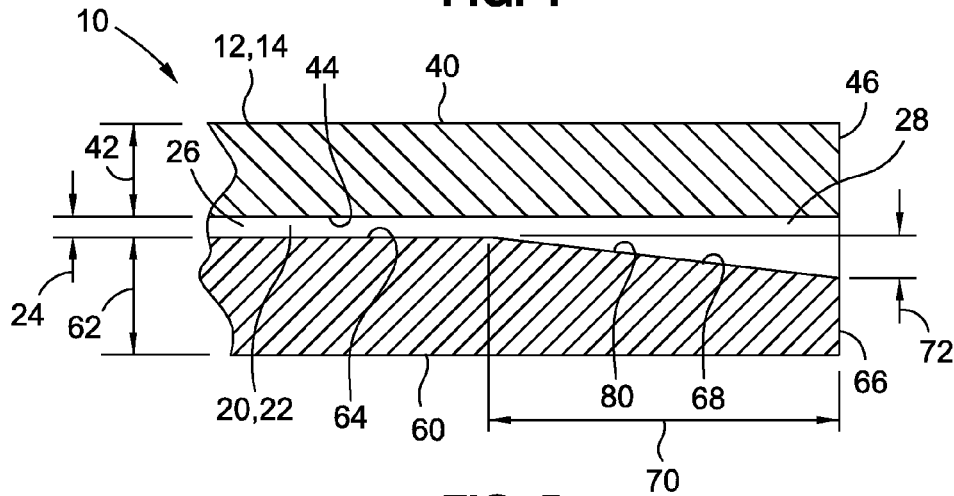
FIG. 5 is a cross-sectional illustration of a panel assembly in a further embodiment wherein the first layer is formed without an edge treatment.

FIG. 5 illustrates an embodiment wherein the edge treatment 68 is limited to the second layer 60 and the first layer 40 is devoid of any edge treatment. The determination of whether the edge treatment 48, 68 is formed in the first layer 40 or the second layer 60 may be based on any one of a variety of factors including cost, manufacturability, and durability. For example, the machinability or formability of the layer material may be a factor in determining whether to limit the formation of an edge treatment 48, 68 to a single one of the layers. Other factors that may be considered in determining which layer to form the edge treatment 48, 68 may include, but are not limited to, the attachment mechanism for installing or attaching the panel assembly 12 to a vehicle or object (e.g., a building), the strength properties of the layer material, the operating environment of the panel assembly 12, and other considerations.

Figure 6:
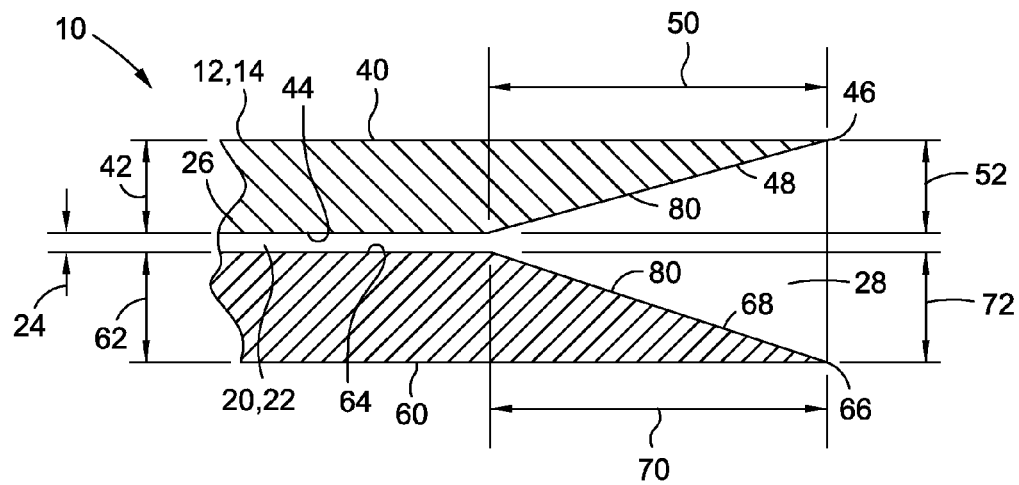
FIG. 6 is a cross-sectional illustration of a panel assembly wherein the edge treatment of the first and second layer is a chamfer having a chamfer height that is substantially equivalent to the thickness of the respective first and second layer.

Referring to FIG. 6, shown is an embodiment of a panel assembly 12 wherein each of the first and second layers 40, 60 includes an edge treatment 48, 68 configured as a chamfer 80 formed along the side edge 46, 66 of the first and second layer 40, 60. Each one of the first and second layers 40, 60 has a corresponding first and second edge treatment height 52, 72 and a corresponding first and second edge treatment length 50, 70. In the embodiment shown, the edge treatment height 52, 72 of the first and second layers 40, 60 may be substantially equivalent to the thickness 42, 62 of the respective first and second layer 40, 60. Such an arrangement may minimize the magnitude of through-thickness stress in the first layer 40, the second layer 60, and/or the adhesive layer 20 at the side edge 46, 66 and may advantageously position the location of maximum stress 210, 212 (FIGS. 43-44) inboard of the side edge 46, 66. Such an arrangement may minimize peel force (not shown) between the first layer 40 and the second layer 60 at the side edge 46, 66. Although not shown in the figures, the intersection of the side edge with an exterior surface (not shown) of any one of the layers of the panel assembly may be rounded or radiused to eliminate the knife edge shown in FIG. 6 and thereby minimize stress concentrations at the exterior surface-side edge intersection (not shown).

Figure 7:
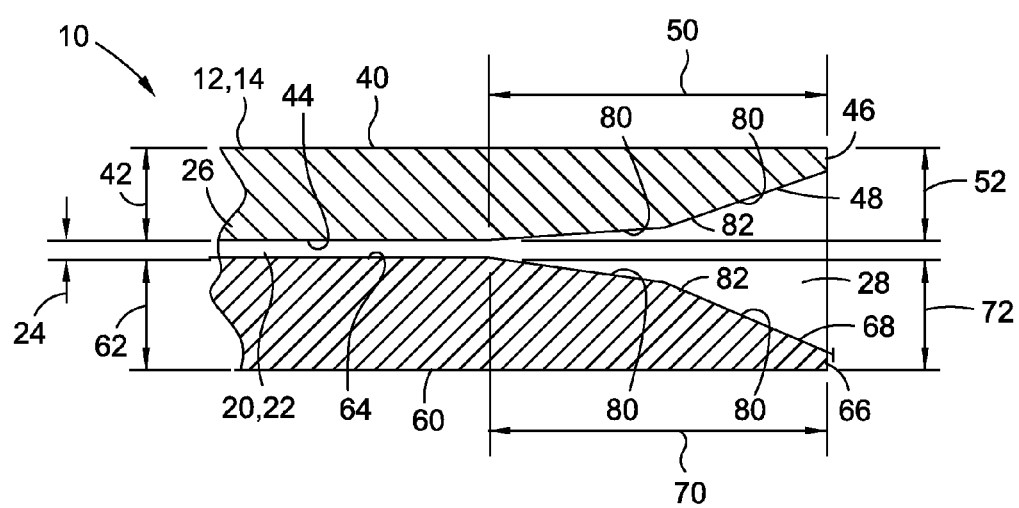
FIG. 7 is a cross-sectional illustration of a panel assembly wherein the edge treatment of the first and second layer is formed as a double chamfer.

Referring to FIG. 7, shown is a further embodiment of the panel assembly 12 wherein each one of the first and second layers 40, 60 includes an edge treatment 48, 68 comprising a double-chamfer 82 configuration. The double-chamfer 82 configuration has two chamfers or bevels formed at different angles. For example, the chamfer 80 nearest the side edge 46, 66 may be formed at a steep angle relative to the angle of the chamfer 80 located furthest from the side edge 46, 66 (i.e., a convex double-chamfer) as shown in FIG. 7. Alternatively, the chamfer 80 nearest the side edge 46, 66 may be formed at a shallow angle relative to the angle of the chamfer 80 located furthest from the side edge 46, 66 (i.e., a concave double-chamfer 82—not shown). Furthermore, although the double-chamfer 82 is shown wherein each chamfer 80 is of generally equal length, the chamfers 80 of the double chamfer 80 may be formed in unequal lengths. It is further contemplated that the edge treatment 48, 68 may be provided in configuration having more than two chamfers such as a triple-chamfer (not shown) configuration or a configuration comprised of more than three chamfers.

Figure 8:
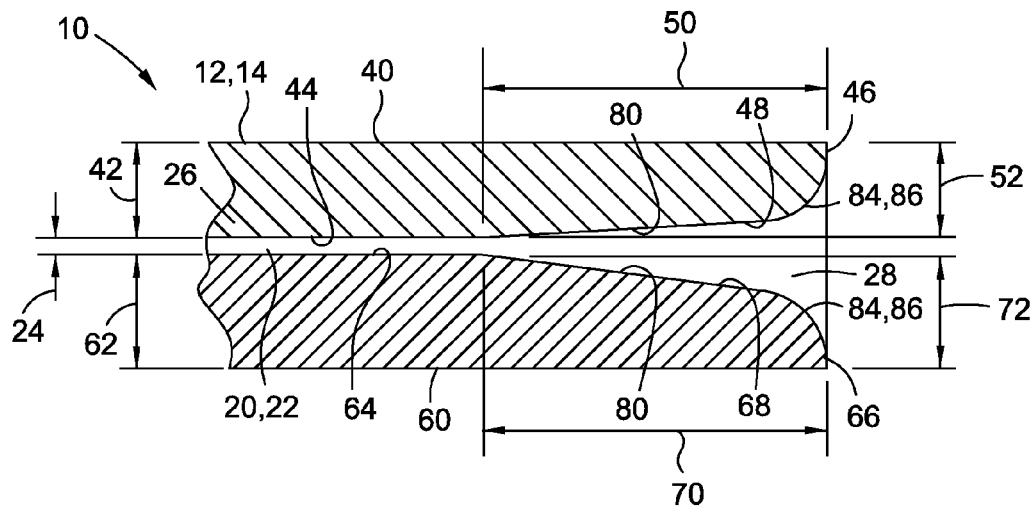
FIG. 8 is a cross-sectional illustration of a panel assembly wherein the edge treatment of the first and second layer is formed as a combination chamfer and radius.

Referring to FIG. 8, shown is a further embodiment of the panel assembly 12 wherein the edge treatment 48, 68 is provided in a chamfer 88—rounded edge 84 configuration. As can be seen, the edge treatment 48, 68 includes a relatively shallow chamfer 80 that may transition to a rounded edge 84 which may terminate at the side edge 46, 66 of the respective layer 40, 60. The rounded edge 84 may comprise a relatively constant radius 86. However, the rounded edge 84 may comprise a variable radius 86 or any other generally rounded configuration.

Figure 9:
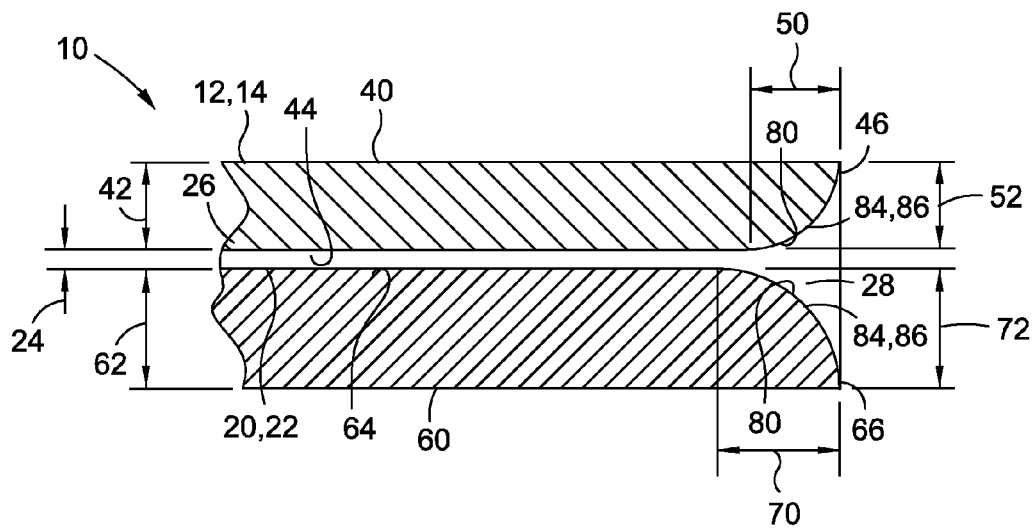
FIG. 9 is a cross-sectional illustration of a panel assembly wherein the edge treatment of the first and second layer is formed as a radius.

Referring to FIG. 9, shown is a further embodiment of the panel assembly 12 wherein the edge treatment 48, 68 is configured as a rounded edge 84. The rounded edge 84 may comprise an approximately constant radius 86, as a variable radius 86, or as a combination of constant radius 86 and variable radius 86 or any other rounded edge 84 configuration. The rounded edge 84 may transition into the faying surface 44, 64 at a tangent (not shown) and/or may transition into the side edges 46, 66 at a tangent. The rounded edge 84 may optionally transition into the faying surface 44, 64 at a tangent to the faying surface 44, 64 and may also optionally transition into the side edges 46, 66 at a tangent to the side edges 46, 66. However, the rounded edge 84 may transition to the faying surface 44, 64 and/or side edges 46, 66 in a non-tangential arrangement. By including a rounded edge 84 in the edge treatment 48, 68, stress concentrations in the side edges 46, 66 may be minimized and panel durability may be improved.

It should be noted that in each one of the above-described edge treatment 48, 68 configurations illustrated in FIGS. 3 and 6-9, although the first and second layers 40, 60 are both illustrated as having edge treatments 48, 68, the panel assembly 12 may be provided such that only one of the first and second layers 40, 60 has an edge treatment 48, 68 and the remaining one of the first and second layers 40, 60 is provided without an edge treatment 48, 68. Furthermore, it should also be noted that although each one of the edge treatments 48, 68 illustrated in FIGS. 3 and 6-9 have substantially similar edge treatment lengths 50, 70 and edge treatment heights 52, 72 for the first layer 40 and second layer 60, the panel assembly 12 may be configured such that the edge treatment length 50 and edge treatment height 52 in the first layer 40 is different than the edge treatment length 70 and edge treatment height 72 of the second layer 60. Furthermore, it is contemplated that any one of the edge treatment 48, 68 configurations illustrated in FIGS. 3 and 6-9 may be combined with any of the other edge treatment 48, 68 configurations. For example, the first layer 40 may be provided with a single chamfer 80 (FIG. 6) edge treatment 48 and the second layer 60 may be provided with a double-chamfer 82 edge treatment 68 (FIG. 7). It should additionally be noted that the illustration of the edge treatment 48, 68 configurations shown in FIGS. 3-9 is not to be construed as limiting other edge treatment 48, 68 configurations that may be applied to the first and/or second layer 40, 60. For example, the edge treatment 48, 68 may be provided in any one of a variety of alternative configurations including, but not limited to, edge treatments 48, 68 having multiple angled surfaces such as a sawtooth arrangement and/or any combination of rounded or radius 86 surfaces, flat or chamfer 80 surfaces, or other configurations.

Referring generally to FIGS. 3-9 and to any other edge treatment configurations disclosed herein, the adhesive layer 20 bonding the first layer 40 to the second layer 60 may be comprised of any suitable material and preferably a material that minimizes stress concentrations along the side edge of the first layer 40 and/or second layer 60. For example the adhesive layer 20 may be comprised of any one of the following materials: polyvinyl butyral, polyurethanes, silicones, epoxies, thermosets, and thermoplastics. The adhesive layer 20 material may optionally be comprised of polyurethane material such as thermoplastic polyurethane material or thermosetting polyurethane material.

In an embodiment, the first layer 40 or second layer 60 may be formed of substantially optically transparent material. However, the first and second layer 40, 60 may of any suitable material having any level of optical transmissibility and are not limited to being formed of substantially optically transparent material. For example, the first layer 40 and/or second layer 60 may be formed of material that is optically non-transmissive or opaque. The first and second layer 40, 60 may be formed of material having varying degrees of light transmissive capability. Furthermore, although the present disclosure discloses the assembly of a panel assembly 12 comprised of layers having different coefficients of thermal expansion by optionally including edge treatments 48, 68 along one or more side edges 46, 66 of one or more layers, the panel assembly 12 may be assembled with two or more layers having substantially similar coefficients of thermal expansion.

In an embodiment, the first layer 40 and/or second layer 60 may be formed of thermoplastic material or thermosetting material. For example, the first layer 40 and/or the second layer 60 may be formed of at least one of the following thermoplastic materials: acrylics, fluorocarbons, polyamides, polyethylenes, polyesters, polypropylenes, polycarbonates, polyurethanes, polyetheretherketones, polyetherketoneketones, and polyetherimides. In addition, the first layer 40 and/or the second layer 60 may be formed of any suitable thermoset including, but not limited to, polyurethanes, phenolics, polyimides, bismaleimides, polyesters, epoxies, and silsesquioxanes. Even further, the first layer 40 and/or the second layer 60 may be formed of glass material. For example, the first layer 40 and/or the second layer 60 may be formed of E-glass (i.e., alumino-borosilicate glass), S-glass (i.e., alumino silicate glass), pure silica, borosilicate glass, optical glass, and other suitable glasses including glass-ceramics and ceramics.

It is further contemplated that the first layer 40 and/or second layer 60 may be formed of inorganic material including, but not limited to, carbons, silicon carbide, and boron-carbide. Even further, the first and/or second layer 40, 60 may be formed of metallic material. It is contemplated that the first layer 40 and/or the second layer 60 may be formed as a solid, monolithic sheet or layer of the same material or as a combination of one or more materials. For example, the first layer 40 and/or the second layer 60 may be formed of one material at one location in the layer 40, 60 such as along the side edges 46, 66 and having a different material at one or more different locations in the same layer 40, 60.

In a further embodiment, the first layer 40 and/or the second layer 60 may optionally be formed as a fiber composite layer (not shown) having one or more fibers (not shown) at least partially embedded in a matrix (not shown). In this regard, the first layer 40 and/or second layer 60 may be fabricated as a fiber-reinforced composite panel comprising a plurality of polymeric, glass, ceramic, and/or metallic fibers embedded within a polymeric matrix, a ceramic matrix, or a metal matrix. For example, the first layer 40 and/or second layer 60 may be formed of substantially optically transparent fibers embedded in a substantially optically transparent polymeric matrix.

It should also be noted that although the structure 10 illustrated in FIG. 1 is configured as a composite panel, the structure 10 may be configured at any one of a variety of sizes, shapes, and configurations and may be incorporated or implemented into any one of a variety of applications. For example, the structure 10 may be configured as a windshield, a canopy, a window, a membrane, an armor panel 14, a structural panel, an architectural panel, or a non-structural article. Furthermore, as was indicated above, the structure 10 is not limited to a configuration having generally planar surfaces but may be provided in any shape, without limitation, and may include a configuration having curved surfaces including compound curvature surfaces.

Figure 10:
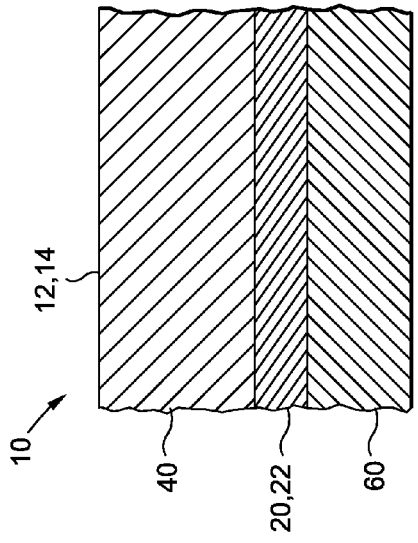
FIG. 10 is a cross-sectional illustration of a panel assembly in an embodiment wherein the first and the second layer are devoid of an edge treatment and wherein the adhesive layer has a bondline thickness of 0.100 inch representing the bondline thickness in Run Number 1 of the thermal analysis run data illustrated in FIG. 46.
Figure 11:
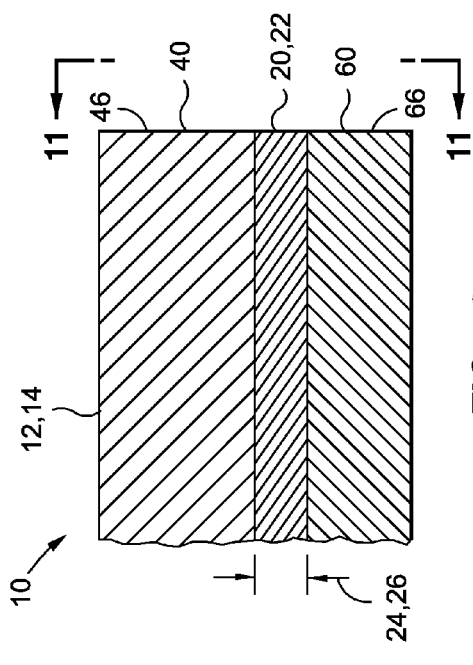
FIG. 11 is an end view of the panel assembly of FIG. 10 taken along line 11.

Referring to FIGS. 10-11, shown is the panel assembly 12 in an embodiment wherein the first layer 40 and the second layer 60 are devoid of an edge treatment and wherein the adhesive layer 20 has a relatively large, constant thickness bondline 22 (e.g., 0.100 inch thick). As described in greater detail below, a relatively large bondline 22 thickness may reduce the magnitude of thermally induced stress at the side edges 46, 66. However, a relatively large constant thickness bondline 22 may reduce ballistic performance and may undesirably add to the weight to the panel assembly 12. The panel configuration of FIGS. 10-11 is presented for comparison with different edge treatment configurations disclosed herein which advantageously provide a reduction in thermally induced stress at the side edge 46, 66 of the panel assembly 12 while maintaining the bondline 22 at a relatively small thickness (e.g., less than approximately 0.100 inch). However, any one of the edge treatment configurations disclosed herein may be used in a panel assembly having a relatively large bondline 22 thicknesses (e.g., greater than 0.100 inch).

Figure 12:
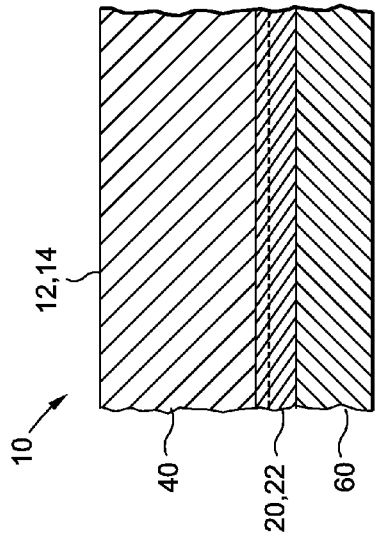
FIG. 12 is a cross-sectional illustration of a panel assembly in an embodiment wherein the edge treatment of the second layer includes a chamfer, the bondline thickness being reduced (e.g., to approximately 0.015 inch) relative to the bondline thickness of FIG. 10, and wherein the adhesive in the edge treatment portion has a different material composition than the adhesive in the main portion.
Figure 13:
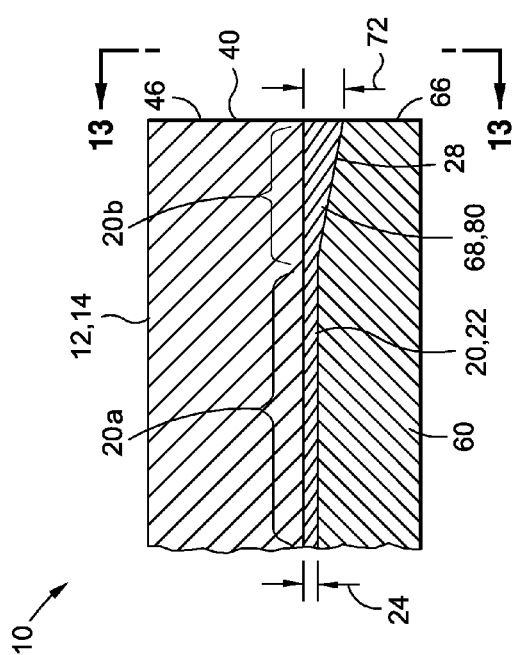
FIG. 13 is an end view of the panel assembly of FIG. 12 taken along line 13.

Referring to FIGS. 12-13, shown is the panel assembly 12 in an embodiment wherein the edge treatment 68 of the second layer 60 comprises a chamfer 80 and wherein the adhesive layer 20 in the main portion 26 of the bondline 22 has a first adhesive material composition 20a that is different than a second adhesive material composition 20b in the edge treatment portion 28. Advantageously, by providing an adhesive 20b in the edge treatment portion 28 that is different than the adhesive 20a in the main portion 26, thermally induced stress along the side edges 46, 66 of the panel assembly 12 may be minimized. For example, the adhesive 20b in the edge treatment portion 28 may be selected to minimize the thermally induced stress caused by a difference in the coefficient of thermal expansion of the first layer 40 relative to the coefficient of thermal expansion of the second layer 60. Selection of the material composition of the adhesive 20b in the edge treatment portion 28 may be based on compatibility of the coefficient of thermal expansion of the adhesive 20b with the coefficient of thermal expansion of the first layer 40 and/or the second layer 60.

The adhesive 20b in the edge treatment portion 28 may also be selected based on other mechanical properties of the adhesive 20b. For example, the adhesive 20b in the edge treatment portion 28 may be selected based on the modulus of elasticity, density, resiliency, volumetric shrinkage, and other properties of the adhesive 20b. It should be noted that providing an adhesive 20b in the edge treatment portion 28 of the bondline 22 that is different than the adhesive 20a in the main portion 26 of the bondline 22 may be implemented in any panel assembly 12 configuration disclosed herein having any edge treatment and is not limited to implementation in the panel assembly 12 embodiment shown in FIGS. 11-12.

Referring to FIGS. 14-15, shown is the panel assembly 12 in an embodiment wherein the edge treatment 68 of the second layer 60 includes a rib spacer 100 extending upwardly from the chamfer toward the first layer 40. A rib spacer may also be provided in the first layer 40 as described below. In FIG. 14, the rib spacer 100 may comprise a relatively thin section of material that may extend upwardly from the second layer 60 toward the first layer 40. The rib spacer 100 may extend up to a height that may be substantially equivalent to the plane where the second layer 60 interfaces with the adhesive layer 20. The rib spacer 100 may support the side edge 66 of the second layer 60 (e.g., polycarbonate layer) against deflection that may occur in the second layer 60 during manufacturing and during use of the panel assembly 12. For example, the rib spacer 100 may support the side edge (not shown) of a polycarbonate layer during vacuum bagging of the panel assembly (not shown) wherein a vacuum bag (not shown) may be applied over the side edge of the polycarbonate layer during curing of the adhesive layer bonding the glass layer to a polycarbonate layer (not shown). Upon drawing a vacuum on the vacuum bag, the vacuum bag may apply a downward force on the side edge of the polycarbonate layer.

The rib spacer 100 in FIGS. 12-13 may prevent the occurrence of voids in the bondline between the glass layer and the polycarbonate layer that may otherwise be generated as a result of deflection or bending of the side edge of the polycarbonate layer due to vacuum bagging operation. As shown in FIGS. 14-15, the rib spacer 100 may be located generally adjacent to the side edge 66 of the second layer 60 and may generally support the side edge 66 of the second layer 60 and prevent excessive movement of the side edge 66 of the second layer 60 toward the first layer 40 due to bending of the second layer 60. The rib spacer 100 may extend along the entire length of one the side edges 46, 66 of the first layer 40 and/or the second layer 60 of the panel assembly 12. Alternatively, the rib spacer 100 may extend along a portion of one or more of the side edges 46, 66. The rib spacer 100 may also be provided in any quantity and in any one of a variety of different sizes (e.g., width), shapes, and configurations as described below.

Referring to FIGS. 16-17, shown is the panel assembly 12 in an embodiment wherein the edge treatment 68 may include a plurality of block spacers 102 that may extend upwardly from the chamfer 80. The block spacer 102 may function in a manner similar to the function of the rib spacers 100 described above. The block spacers 102 may be spaced apart from one another along the side edge 46, 66 of the panel assembly 12 as illustrated in FIG. 17. The block spacers 102 may be provided in substantially equivalent geometry or the block spacers 102 may have different geometries. Furthermore, the gaps 104 between the block spacers 102 may be uniform or variable along any portion of the length of the side edge 46, 66.

Referring to FIGS. 18-19, shown is the panel assembly 12 in an embodiment wherein the block spacers 102 have sides 106 that may be tapered 108 as shown in FIG. 19. The block spacers 102 may be spaced apart from one another to define a series of gaps 104. As indicated above with regard to the block spacers 102 illustrated in FIGS. 16-17, the block spacers 102 shown in FIGS. 18-19 may be included in the edge treatment 48 of the first layer 40 and/or in the edge treatment 68 of the second layer 60.

Referring to FIGS. 20-21, shown is the panel assembly 12 in an embodiment wherein the block spacers 102 have tapered backs 110 facing inwardly away from the side edges 46, 66. The block spacers 102 may also have chamfers 112 facing toward an exterior of the panel assembly 12. The tapered sides 108, tapered backs 110, and chamfers 112 that may optionally be included in the block spacers 102 shown in FIGS. 16-21 may reduce stress concentrations in the interior corners at the base of the block spacers 102.

Referring to FIGS. 22-23, shown is the panel assembly 12 in an embodiment wherein block spacers 102 are arranged in a sinusoidal pattern 114 (FIG. 23). The sinusoidal pattern 114 may provide a relatively smooth transition between the block spacers 102 and the edge treatment 48 from which the block spacers 102 extend. In this regard, the sinusoidal pattern 114 may reduce or minimize stress concentrations that may otherwise occur in interior corners at the base of the block spacers 102.

Referring to FIGS. 24-25, shown is the panel assembly 12 in an embodiment wherein the edge treatment 68 of the second layer 60 includes a plurality of rib spacers 100 extending upwardly from the chamfer 80 of the second layer 60 and arranged in spaced relationship to one another. The rib spacers 100 may each extend along a direction generally parallel to a length of the side edge 46. The rib spacers 100 may provide support for the second layer 60 against deflection of the side edge 66 as described above. In this regard, the plurality of rib spacers 100 illustrated in FIGS. 24-25 may distribute and reduce the load imposed by the first layer 40 on the rib spacers 100 during manufacturing. Different adhesives may be included in the spacing between the rib spacers 100. Selection of the adhesive for a given space between a pair of rib spacers 100 may be based upon the mechanical properties of the adhesive, the location of the pair of rib spacers 100 relative to the side edge 46, and on other factors.

Figure 27:
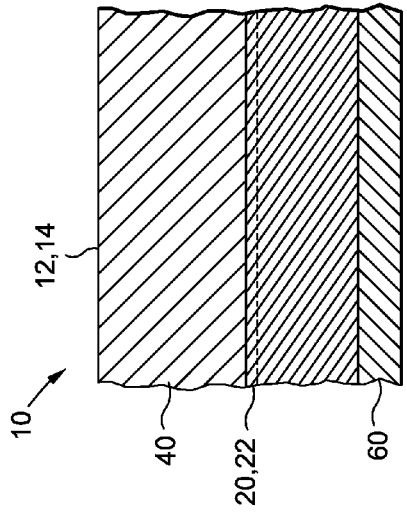
FIG. 27 is an end view of the panel assembly of FIG. 26 taken along line 27 and illustrating the outermost one of the rib spacers.
Figure 26:
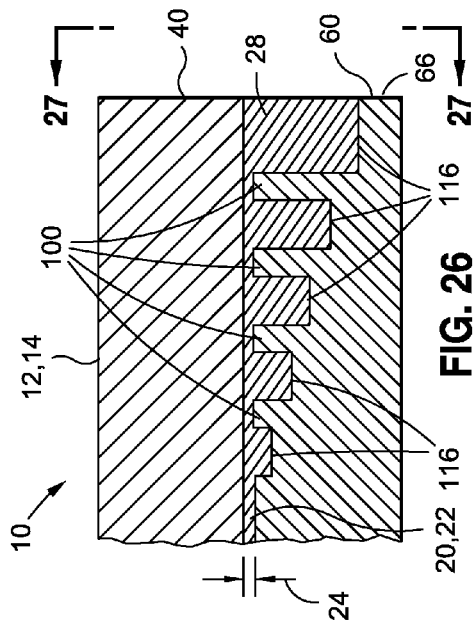
FIG. 26 is a cross-sectional illustration of a panel assembly in an embodiment wherein the edge treatment of the second layer includes a plurality of rib spacers arranged in stepped, spaced relationship to one another along an inward direction from the side edge.

Referring to FIGS. 26-27, shown is the panel assembly 12 in an embodiment wherein the rib spacers 100 are arranged in stepped 116 relationship to one another along an inward direction from the side edge 46. In contrast to the angled chamfer of the embodiment shown in FIGS. 24-25, the embodiment shown in FIGS. 28-29 may simplify manufacturing by allowing simple forming or machining of the rib spacers 100 into one or both of the layers 40, 60.

Figure 29:
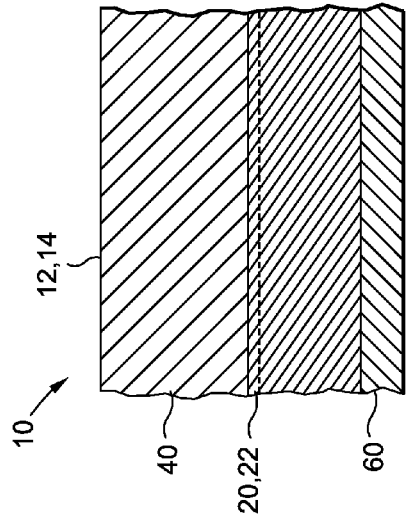
FIG. 29 is an end view of the panel assembly of FIG. 28 taken along line 29 and illustrating the outermost one of the rib spacers.
Figure 28:
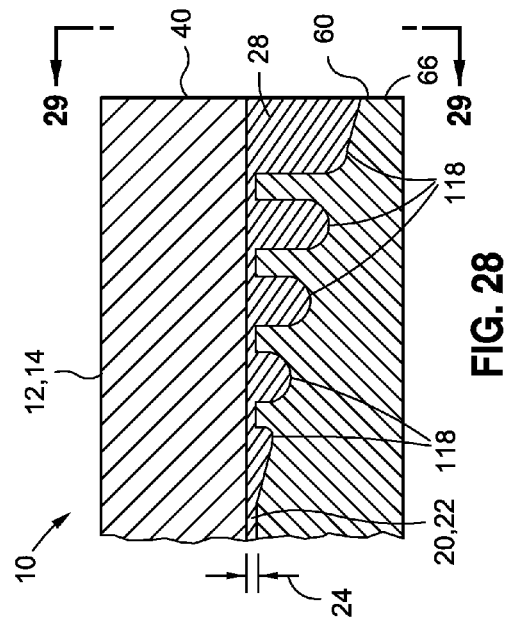
FIG. 28 is a cross-sectional illustration of a panel assembly in an embodiment having radiused corners between the plurality of rib spacers.

Referring to FIGS. 28-29, shown is the panel assembly 12 in an embodiment including radiused corners 118 between the plurality of rib spacers 100. The radiused corners 118 may reduce stress concentrations that may otherwise occur at interior corners at the base of the rib spacers 100. The radiused corners 118 may be provided by using a radiused cutting tool or by forming the radiused corners 118 in a molding operation.

Referring to FIGS. 30-31, shown is the panel assembly 12 in an embodiment having a wedge strip spacer 120 provided as a separate component from the first layer 40 and the second layer 60. The wedge strip spacer 120 may be formed of material that may be a different material than the material of the first layer 40 and/or the second layer 60. The wedge strip spacer 120 may be adhesively bonded between the first and second layer 40, 60 in the edge treatment portion 28 of the bondline 22. The wedge strip spacer 120 may be adhesively bonded using an adhesive that is the same or different than the adhesive used in the main portion 26 of the bondline 22. In the embodiment shown, the wedge strip spacer 120 may extend generally along a direction parallel to the length of the side edge 46 and may be sized and configured to support the first layer 40 in a manner described above with regard to the rib spacer 100 configurations. The wedge strip spacer 120 may have a cross sectional shape that may be complementary to the geometery of the edge treatment portion 28. For example, the wedge strip spacer 120 may be formed in a cross sectional shape and size that generally approximates the cross sectional shape, size, and the volume between the first and second layer 40, 60 in the edge treatment portion 28.

The material composition of the wedge strip spacer 120 may be selected based on compatibility with the first layer 40, the second layer 60, and/or the adhesive layer 20. For example, the material composition of the wedge strip spacer 120 may be selected based on the coefficient of the thermal expansion of the wedge strip spacer 120 and the coefficient of thermal expansion of the first layer 40, the second layer 60, and/or the adhesive layer 20. The material composition of the wedge strip spacer 120 may also be selected based on modulus of elasticity, volumetric shrinkage, and other properties of the wedge strip spacer 120. Non-limiting examples of material from which the wedge strip may be formed include any polymeric material (e.g. plastic), rubber, fiber reinforced material, ceramic material, and any metallic or non-metallic material or combination thereof.

Referring to FIGS. 32-33, shown is the panel assembly 12 in an embodiment having a flat strip spacer 122 mounted between the first layer 40 and a flat 132 formed on the chamfer 80 of the second layer 60. Although shown as having a rectangular cross section, the flat strip spacer 122 may be provided with any cross sectional shape that may be supported on a flat 132 of an edge treatment. In this regard, the flat strip spacer 122 is not limited for use with a chamfer edge treatment 68 as illustrated in FIG. 32 but may be used with any edge treatment configuration having a flat 132. The flat 132 may be configured to support a corresponding flat surface of the flat strip spacer 122 and may prevent the strip spacer from slipping out of the edge treatment portion 28 under clamp-up pressure between the first and second layer 40, 60 during manufacturing or during use of the panel assembly 12. By orienting the flat 132 of the edge treatment 48 generally perpendicular to the direction of pressure exerted by the first layer 40 on the flat strip spacer 122 such as during vacuum bagging, sideways movement or slippage of the flat strip spacer 122 out of the panel assembly 12 may be avoided.

Figure 34:
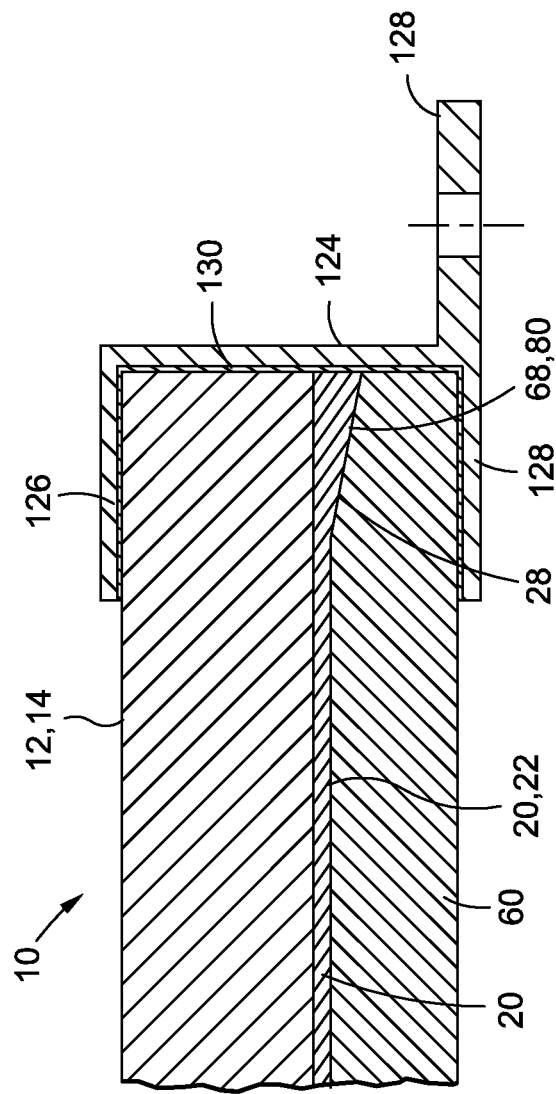
FIG. 34 is a cross-sectional illustration of a panel assembly having a mounting bracket cover the side edges of the first and second layers.

Referring to FIG. 34, shown is a cross-section of a panel assembly 12 having a mounting bracket 124 including a pair of legs 126 extending around the side edge 46, 66 of the first and second layers 40, 60. The mounting bracket 124 shown in FIG. 34 represents one of a variety of different mounting bracket embodiments that may be implemented for mounting the panel assembly 12 to a vehicle or structure using the flange 128 or other suitable arrangement. The mounting bracket 124 may optionally include a sealant 130 for sealing the side edge 46, 66 of the panel assembly 12 against the environment and prevent the intrusion of moisture, dirt, and other undesirable elements. The mounting bracket 124 may stabilize the bond between the first and second layer 40, 60 and any additional layers that may be included with the panel assembly 12. Advantageously, the mounting bracket 124 may be sized and configured to cover the edge treatment portion 28 of the bondline 22 to reduce the effects of the edge treatment on the ballistic and/or optical performance of the panel assembly 12.

Figure 35:
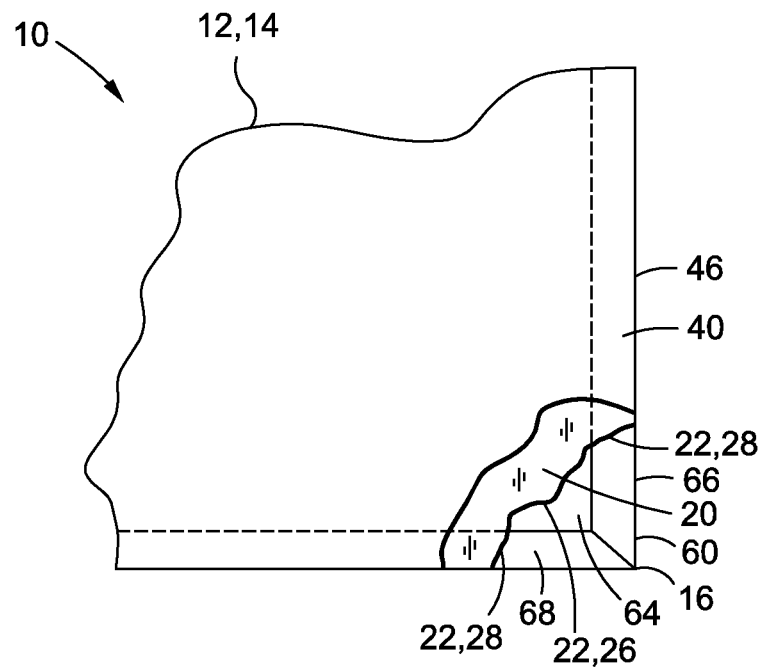
FIG. 35 is a top view of a portion of the panel assembly taken along viewing line 35 of FIG. 1 and illustrating a corner of the panel assembly having a non-rounded configuration.

Referring to FIG. 35, shown is an embodiment of the panel assembly 12 and illustrating a corner 16 of the panel assembly 12. The corner 16 has a non-rounded or sharp-corner configuration. The non-rounded corner 16 configuration may be located at the intersection of a pair of side edges 46, 66 such as the generally straight side edges 46, 66 of the panel assembly 12 shown in FIG. 35. Although shown as having a generally perpendicular corner 16, the corner 16 may be formed at any angle depending on the relative orientation of the side edges 46, 66.

Figure 36:
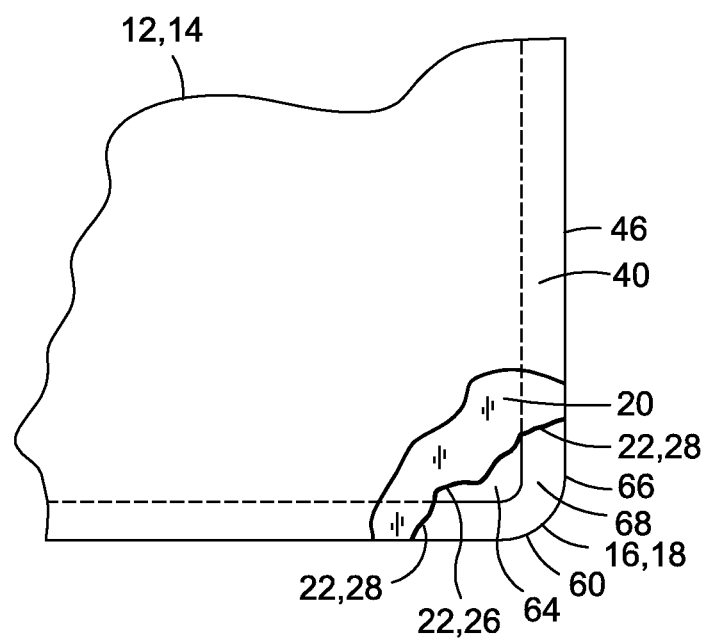
FIG. 36 is a top view of a portion of the panel assembly illustrating the corner of the panel assembly having a rounded configuration.

FIG. 36 illustrates an alternative embodiment of the panel assembly 12 wherein the corner 16 has a rounded corner 18 configuration. The rounded corner 18 configuration of the corner 16 may minimize stress concentrations that may occur at the corner 16 as described in greater detail below. By minimizing stress concentrations at the corner 16 of the panel assembly 12, peel forces at the side edges 46, 66 of the corner 16 may be minimized or reduced which may improve the durability of the panel assembly 12.

Referring to FIG. 37, shown is a thermal modeling solution of a portion of a panel assembly 204 comprised of a glass layer 240, a polycarbonate layer 260, and a constant-thickness adhesive layer 220 bonding the glass layer 240 to the polycarbonate layer 260. The glass layer 240 may have a glass layer thickness 242, a glass layer faying surface 244, and a glass layer side edge 246. The polycarbonate layer 260 may have a polycarbonate layer thickness 262, a polycarbonate layer faying surface 264, and a polycarbonate layer side edge 266.

In FIG. 37, the adhesive layer 220 has a bondline 222 with a thickness 224 that may be generally constant from a panel centerline 218 of the panel assembly 204 to the side edges 246, 266 of the glass and polycarbonate layers 240, 260. The thermal modeling solution of the panel assembly 204 includes stress contours 208 representing differing stress magnitudes 202 with stress values corresponding to the stress contour legend 200 of FIG. 38. The stresses in the panel assembly 204 of FIG. 37 were induced due to a mismatch in the coefficient of the thermal expansion 294 of the glass layer 240 relative to the coefficient of thermal expansion 296 of the polycarbonate layer 260. The thermal modeling solution was generated from a finite element model constructed using material properties of the glass layer 240 material modeled as Borofloat, commercially available from Schott North America, Inc. of Louisville, Ky. The polycarbonate layer 260 modeled in the thermal modeling solution comprised a polycarbonate material. The adhesive layer 220 modeled in the thermal modeling solution comprised polyurethane adhesive. The panel assembly 204 was modeled with a stress-free temperature of approximately 180° Fahrenheit. Thermally induced stresses in the thermal modeling solution were analyzed at 80° Fahrenheit.

Referring to FIG. 38 is a stress contour legend illustrating stress magnitudes 202 corresponding to the stress contour 208 plots of the thermal modeling solution of the panel assembly 204 configurations shown in FIGS. 37 and 39-44.

Referring to FIG. 39, shown is an enlarged view of a portion of the panel assembly 204 taken along line 39 of FIG. 37. The bondline 222 in FIG. 39 was modeled with a substantially constant thickness 224 of 0.015 inch between the glass layer 240 and the polycarbonate layer 260. Shown in FIG. 39 are the relative stress magnitudes in the different finite elements 206 that make up the finite element model of the panel assembly 204 and illustrating a relatively high magnitude tensile stress 212 with a location of maximum stress 210 at a relatively short distance 214 from the side edges 246, 266 of the glass layer 240 and the polycarbonate layer 260 of the panel assembly 204.

Referring to FIG. 40, shown is an enlarged view of the panel assembly 204 wherein the bondline 222 was modeled with an increased thickness 224 of 0.100 inch. As can be seen in FIG. 40, the magnitude of the tensile stress 212 is reduced relative to FIG. 39 and the location of maximum stress 210 in FIG. 40 is positioned at a greater distance 214 from the side edges 246, 266 relative to the distance 214 of the location of maximum stress 210 from the side edges 246, 266 of FIG. 39 with a 0.015 inch bondline thickness 224. However, as was indicated above, increasing the thickness 224 of the bondline 222 (e.g., to 0.100 inch or greater) reduces ballistic performance of a panel assembly 12. Furthermore, increasing the thickness 224 of the bondline 222 between layers of a panel assembly 204 adds weight to the panel assembly 204.

Referring to FIG. 41, shown is a thermal modeling solution of a panel assembly 204 comprising a glass layer 240 bonded to a polycarbonate layer 260 using a polyurethane adhesive layer 220 and wherein the glass layer 240 has an edge treatment comprising a chamfer 248. Advantageously, the glass chamfer 248 may reduce the magnitude of the stress 212 at the side edges 246, 266 of the panel assembly 204. Furthermore, the chamfer 248 in the glass layer 240 may move the location of maximum stress 210 inboard away from the side edges 246, 266 which may effectively reduce peel forces (not shown) that may otherwise occur at the side edges 246, 266.

Referring to FIG. 42, shown is an enlarged view of a portion of the panel assembly 204 of FIG. 41 and illustrating the chamfer 248 formed in the glass layer 240 at a glass chamfer height 252 of 0.025 inch. The bondline 222 has a thickness 224 of 0.015 inch in the main portion 226 of the bondline 222. The bondline 222 in the chamfer portion is identified by reference numeral 228. As was indicated above, maintaining the bondline 222 in the main portion 226 at a relatively small thickness 224 may improve ballistic performance of the panel assembly 204 and may minimize weight of the panel assembly 204. In FIG. 42, the glass chamfer 248 in the glass layer 240 with glass chamfer height 252 of 0.025 inch results in a reduction in the stress 212 magnitude relative to the stress 212 magnitude for the bondline 222 of constant thickness 224 (0.015 inch) in FIG. 39. In addition, for the panel assembly 204 of FIG. 42, the location of the maximum stress 210 is positioned at a further distance 214 inboard of the side edges 246, 266 relative to the location of maximum stress 210 for the constant thickness 224 bondline 222 version of the panel assembly 204 of FIG. 39. In this regard, it can be seen that by including an edge treatment 48, 68 such as a chamfer in at least one of the layers 240, 260, a reduction in the magnitude of the thermally induced stress 212 may be achieved. Furthermore, by including an edge treatment 48, 68 such as a chamfer in at least one of the layers 240, 260, a shifting of the location of maximum stress 210 away from the side edges 246, 266 may be achieved.

Referring to FIG. 43, shown is an embodiment of the panel assembly 204 wherein the chamfer 248 in the glass layer 240 has a glass chamfer height 252 of approximately 0.050 inch. The bondline thickness 224 in the main portion 226 is maintained at 0.015 inch similar to the bondline thickness 224 of FIG. 42. In FIG. 43, by increasing the glass chamfer height 252 to 0.050 inch, it can be seen that the magnitude of the stress 212 at the side edges 246, 266 may be further reduced. Furthermore, the location of maximum stress 210 is moved a greater distance 214 inboard from the side edges 246, 266 relative to the location of the maximum stress 210 in FIG. 42.

FIG. 44 illustrates a further embodiment of the chamfer 80 having a glass chamfer height 252 of 0.100 inch and which tapers to a bondline thickness 224 of 0.015 inch in the main portion 226. The increase in glass chamfer height 252 to 0.100 inch results in a further decrease in the thermally induced stress magnitude 212 and a further shifting of the location of maximum stress 210 to an increased distance 214 inboard of the side edges 246, 266.

Figure 45:
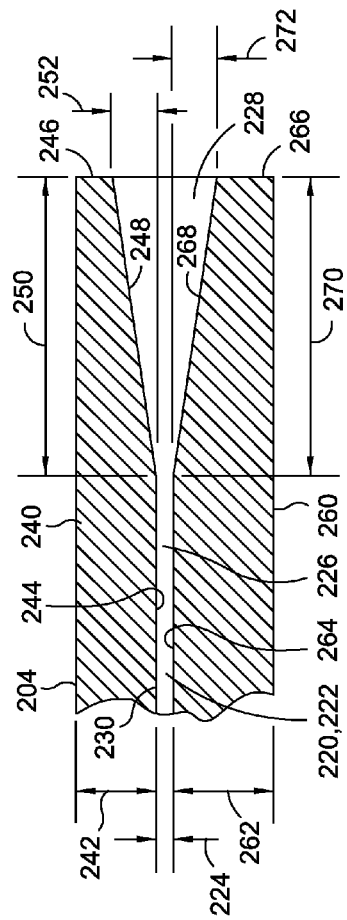
FIG. 45 is a cross-sectional illustration of a panel assembly comprised of a glass layer, a polycarbonate layer, and an adhesive layer (i.e., bondline) and corresponding to thermal analysis run data of the panel assembly illustrated in FIG. 46.
Figure 46:
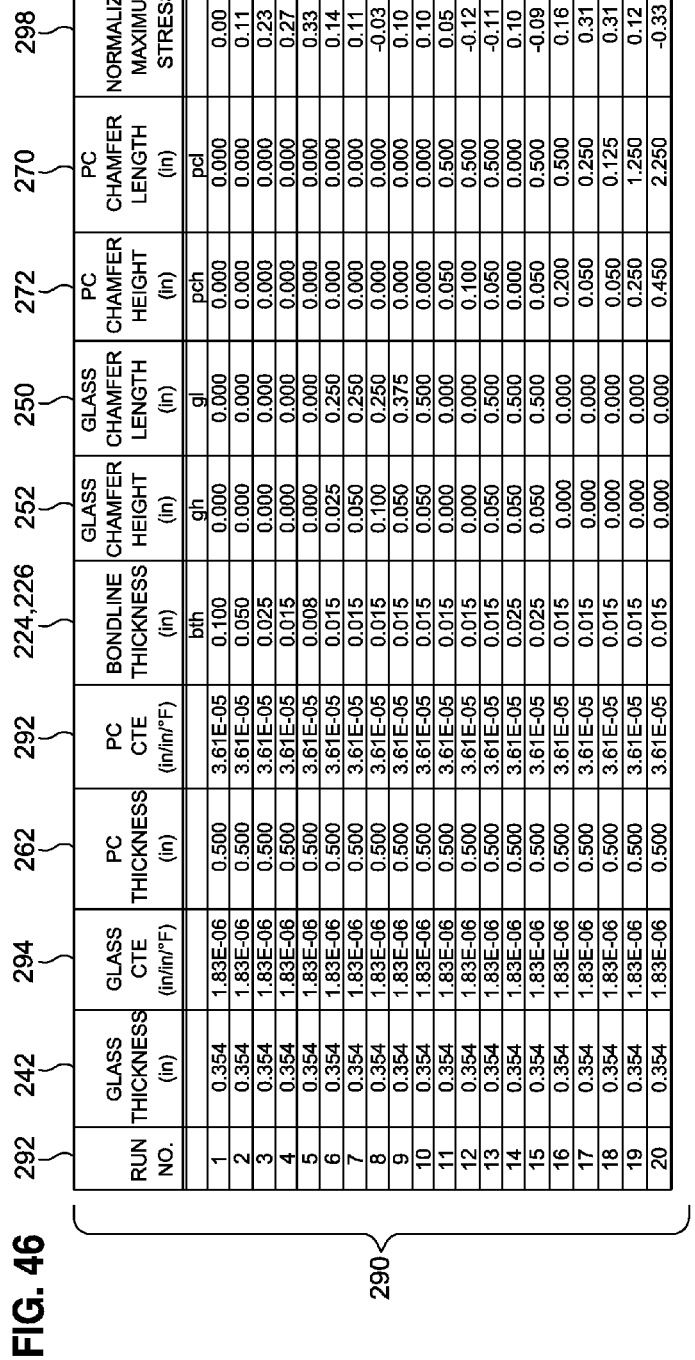
FIG. 46 is a table of thermal analysis run data for different configurations of the panel assembly wherein the geometry of the chamfers and the bondline was varied and further listing the thermally-induced maximum stress for each run normalized to the thermal modeling solution of a panel assembly having a constant-thickness bondline of 0.100 inch as shown in FIG. 40.

Referring to FIG. 45, shown is a sectional illustration of a panel assembly 204 and illustrating the dimensions listed in FIG. 46 for the glass layer 240, the polycarbonate layer 260, and the adhesive layer 220. In FIG. 45, the glass layer may have a glass layer thickness 242, a glass layer faying surface 244, and a glass layer side edge 246. The polycarbonate layer 260 may have a polycarbonate layer thickness 262, a polycarbonate layer faying surface 264, and a polycarbonate layer side edge 266. The glass layer 240 may also include a glass layer chamfer 248 having a glass chamfer length 250 and a glass chamfer height 252. The polycarbonate layer 260 may have a polycarbonate chamfer 268 having a polycarbonate chamfer length 270 and a polycarbonate chamfer height 272. FIG. 45 corresponds to a series of thermal analysis runs for panel assemblies 204 having various chamfer 248, 268 arrangements as presented in FIG. 46.

Referring to FIG. 46, shown is a chart illustrating thermal modeling run data 290 for panel assembly 204 configurations comprised of the glass layer 240 and the polycarbonate layer 260 bonded by a polyurethane adhesive layer 220 having a main portion 226 bondline thickness 224. In each one of the thermal analysis runs 292, the glass layer 240 had a thickness of approximately 0.35 inch and the polycarbonate layer 260 had a thickness of approximately 0.50 inch. In addition, for each one of the thermal analysis runs 292, the glass layer 240 had the same coefficient of thermal expansion (i.e., 1.86E-6) which was different than the coefficient of thermal expansion of the polycarbonate layer 260 (i.e., 3.61E-5) that was used in each of the runs shown in FIG. 46. The panel assembly 204 was modeled with a stress-free temperature of approximately 180° Fahrenheit. Thermally induced stresses in the panel assembly 204 were the result of reducing the temperature of the panel assembly 204 from approximately 180° Fahrenheit to approximately 80° Fahrenheit.

As shown in FIG. 46, the thickness 224 of the bondline 222 in the main portion 226 of the panel assembly 204 was varied in several of the thermal analysis runs 292. Run Number 1 had a bondline of constant thickness 224 in the main portion 226 of 0.100 inch. Run Numbers 2-15 were modeled with variations in the bondline thickness 224 and variations in the glass chamfer 248 geometry and the polycarbonate chamfer 268 geometry. Run Numbers 16-20 were modeled with a bondline thickness 224 of 0.015 inch. The bondline thickness 224 and the chamfer 248, 268 geometry was varied in Run Numbers 16-20 to determine the effect of chamfer aspect ratio on thermally induced stress in the panel assembly 204. The maximum stresses 298 resulting from thermal modeling in Run Numbers 2-20 were normalized relative to the maximum stress of Run Number 1. As can be seen in FIG. 46, Run Numbers 8, 12, 13, 15 and 20 had the lowest normalized maximum stress 298. In addition, it can be seen that Run Numbers 8, 12, 13, 15, and 20 were also the runs where the total chamfer height (e.g., the glass chamfer height 252 plus polycarbonate chamfer height 272) was at a maximum. In this regard, the thermal modeling run data 290 in FIG. 46 may indicate that stress reductions in the panel assembly 204 adjacent the side edges 246, 266 may be driven by the glass chamfer height 252 and/or the polycarbonate chamfer height 272.

Figure 47:
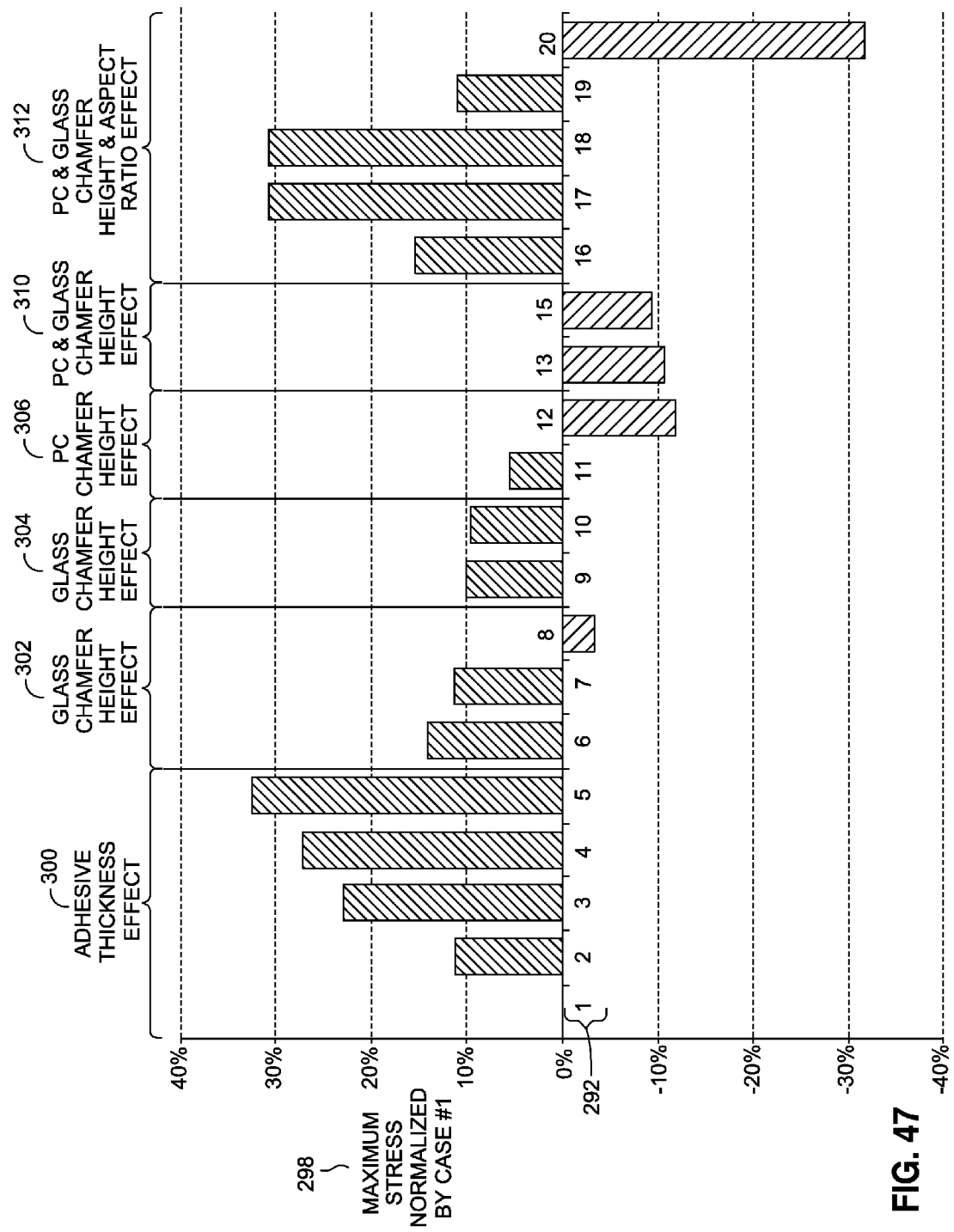
FIG. 47 is a graphic illustration of the thermally-induced maximum stress (normalized to Run Number 1) for each run listed in FIG. 46 and illustrating the effect of bondline thickness, chamfer height, chamfer length, and chamfer aspect ratio on maximum stress.

Referring to FIG. 47, shown is a graphical illustration of the thermally-induced maximum stress 298 in the through-thickness direction for each of Run Numbers 2-20 normalized to the maximum stress 298 (FIG. 46) of Run Number 1 and illustrating the effect of chamfer height 252, 272 (FIG. 45), chamfer length 250, 270 (FIG. 45), bondline thickness 224 (FIG. 45), and chamfer aspect ratio on maximum stress in the panel assembly 204 (FIG. 45). The graphical illustration of FIG. 46 groups the Run Numbers 1-20 by effect on stress in the panel assembly 204 (FIG. 45). For example, shown are groupings by adhesive thickness effect 300, glass chamfer height effect 302, glass chamfer length effect 304, polycarbonate chamfer height effect 306, polycarbonate chamfer/glass chamfer effect 310, and polycarbonate chamfer/glass chamfer effect and aspect ratio effect 312. As can be seen, Run Numbers 12, 13, 15 are included in the polycarbonate chamfer height effect 306 and polycarbonate chamfer/glass chamfer effect 310 groups and had relatively low values for normalized maximum stress 298. As was indicated above, Run Numbers 12, 13 and 15 were the runs where the total chamfer height (e.g., the glass chamfer height 252 plus the polycarbonate chamfer height 272) was at a maximum of 0.100 inch. Run 20 also had the largest chamfer height of 0.450 inch and resulted in the lowest normalized value for maximum stress 298.

In FIGS. 46-47, Run numbers 16-20 illustrate the effect of chamfer aspect ratio on stress level. For example, Run Numbers 16 and 18 each had chamfer aspect ratios (i.e., chamfer length/chamfer height) of 2.5. An increase in chamfer height from 0.050 inch in Run Number 18 to a chamfer height of 0.200 in Run Number 16 resulted in a reduction in normalized maximum stress from approximately 0.31 (Run Number 18) to 0.16 (Run Number 16). Run Numbers 17, 19 and 20 all had chamfer aspect ratios of 5.0. The chamfer height was varied while maintaining the chamfer aspect ratio constant. As shown in FIGS. 46 and 47, an increase in chamfer height from 0.050 inch in Run Number 17 to a chamfer height of 0.250 in Run Number 19 and a further increase to 0.450 inch in Run Number 20 resulted in corresponding reductions in normalized maximum stress from 0.16 (Run Number 18) to 0.12 (Run Number 16) and to −0.33 (Run Number 20) indicating that increasing the chamfer height while maintaining a constant aspect ratio results in a reduction in edge stress.

Figure 48:
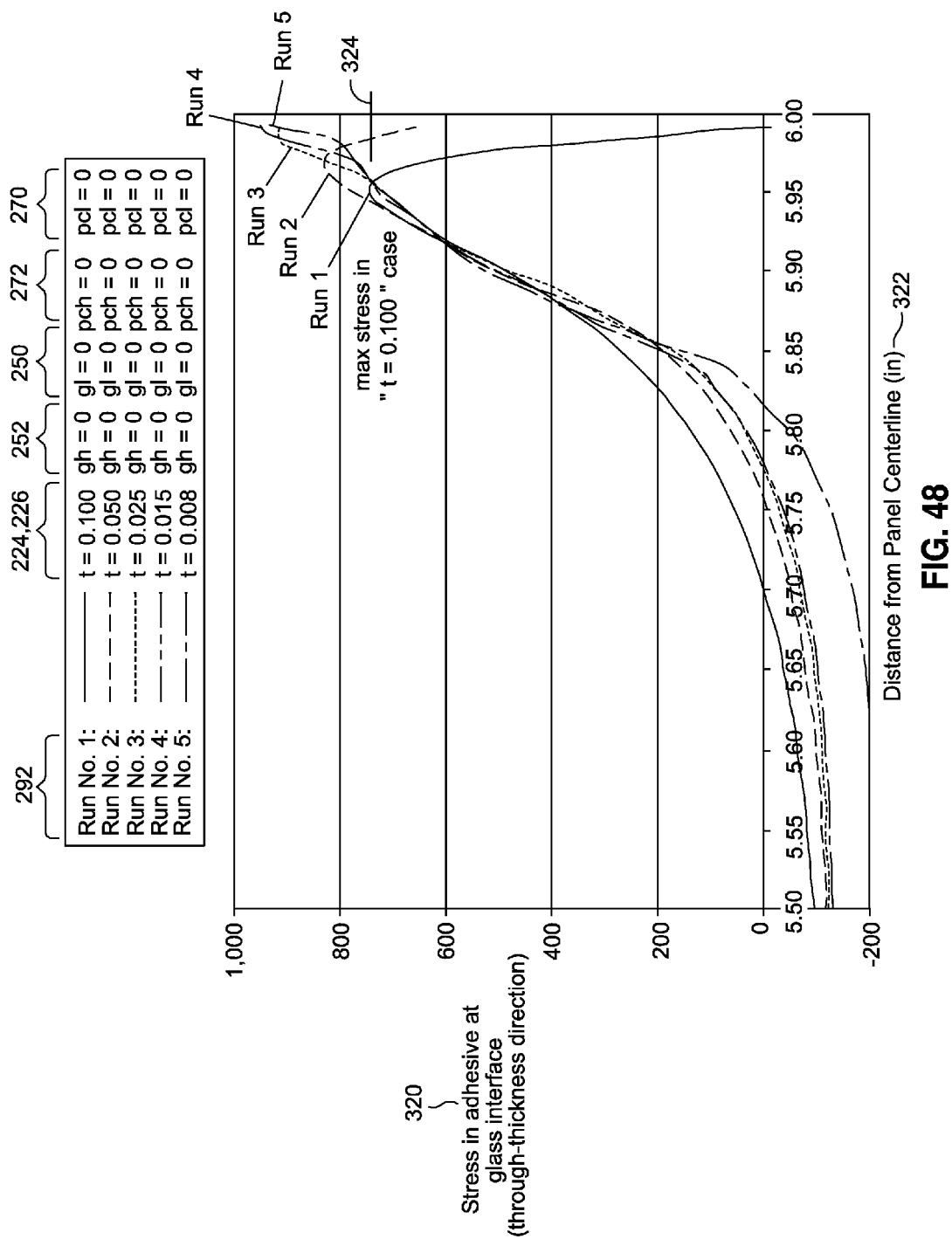
FIGS. 48-52 are plots of through-thickness stress in the adhesive layer at the glass-adhesive interface plotted as a function of distance from the panel centerline for the different thermal modeling runs listed in FIG. 46.

Referring to FIG. 48, shown is a plot of through-thickness stress 320 in the adhesive at the glass-adhesive interface 230 (FIG. 41) within a distance 322 of approximately 0.50 inch from the side edges 246, 266 (FIG. 45) for Run Numbers 1-5 as illustrated in FIG. 47. As shown in FIG. 48, the location of maximum stress 210 (FIG. 41) for at least Run Numbers 1 and 2 is slightly inboard of the side edges 246, 266 by approximately 0.050 inch. However, the maximum stress for Run Numbers 3, 4 and 5 is essentially located at the side edges 246, 266 of the panel assembly 204 (FIG. 45) which may indicate an increased susceptibility for the occurrence of peel forces or delaminations in the panel assembly 204 at the side edges 246, 266.

Figure 49:
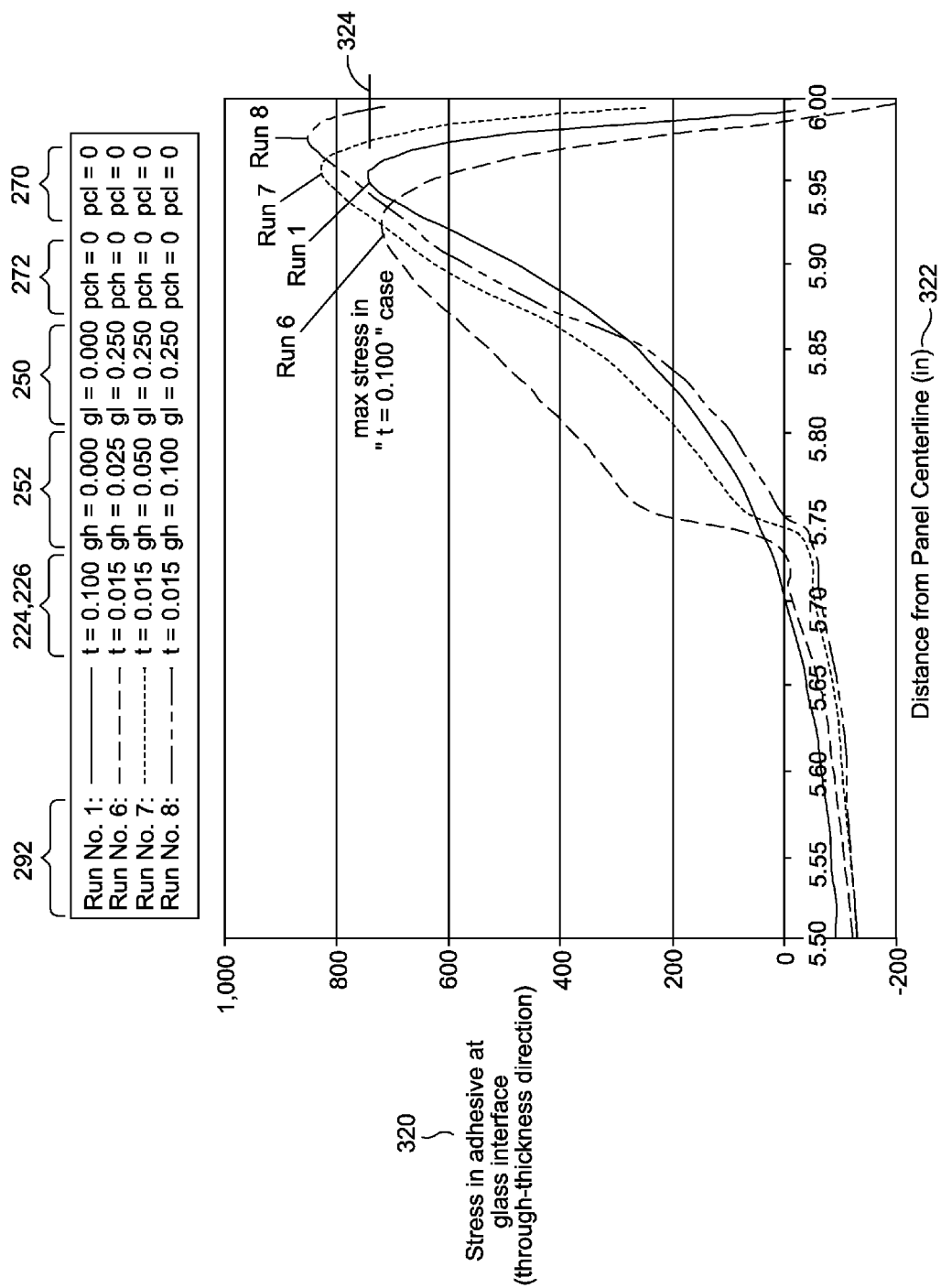

Referring to FIG. 49, shown are plots of the thermally induced stress for Run Numbers 1 and 6-8. As shown in FIG. 49, the panel assembly 204 (FIG. 45) model for Run Numbers 6-8 included a chamfer 248 (FIG. 45) in the glass layer 240 (FIG. 45). The stress in the bondline 222 (FIG. 45) is negligible (i.e., Run Numbers 1 and 6-8) for a substantial portion of the distance 322 between the panel centerline 218 (FIG. 45) and the side edges 246, 266 (FIG. 45). The stress becomes positive (i.e., tensile) starting at approximately 0.3 inch from the side edges 246, 266. The location of maximum stress 210 (FIG. 41) for Run Numbers 6-8 occurs within a distance 322 of approximately 0.020 inch to 0.080 inch from the side edges 246, 266. In FIG. 26, it can also be seen that the magnitude of the stress for Run Number 8 is lower than the maximum stress 324 for Run Number 1. Comparing the plots for Run Numbers 6-8 in FIG. 49 to the plot of Run Number 4 in FIG. 48, it can be seen that Run Numbers 6-8 with the chamfer 248 in the glass layer 240 have a reduced stress relative to the stress in the panel assembly with 0.015 inch constant thickness 224 bondline 222 of Run Number 4.

Figure 50:
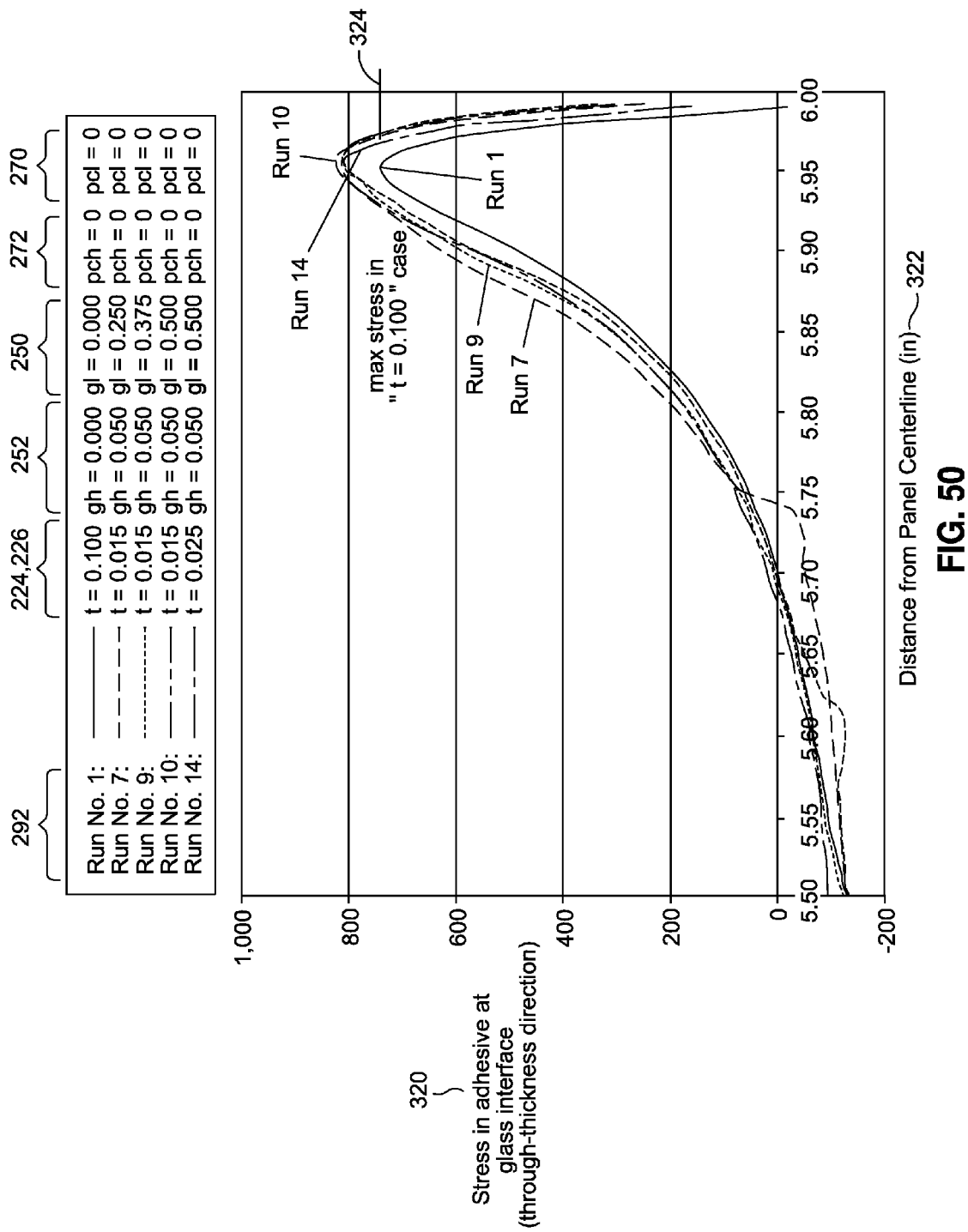

Referring to FIG. 50, shown is a plot of the through-thickness stress 320 at the glass-adhesive interface 230 (FIG. 45) for Run Numbers 7, 9, 10, and 14 and illustrating a comparable stress 212 (FIG. 45) magnitude for Run Numbers 7, 9, and 10 relative to the stress 212 (FIG. 45) magnitude in the 0.100 inch constant thickness 224 bondline 222 of Run Number 1. Comparing FIG. 28 to FIG. 48, it can be seen in FIG. 28 that the maximum stress 210 (FIG. 45) for panel assembly 204 of Run Numbers 7, 9 and 10 is located a further distance 322 (FIG. 45) from the side edges 246, 266 (FIG. 45) than the location of maximum stress 210 for Run Number 4 (i.e., 0.015 inch constant thickness 224 bondline 222) which is essentially located directly at the side edges 246, 266 as illustrated in FIG. 48. As indicated above, a location of maximum stress 210 at the side edges 246, 266 of the panel assembly 204 may indicate an increased susceptibility for peel forces or delaminations which may lead to reduced durability of the panel assembly 204.

Figure 51:
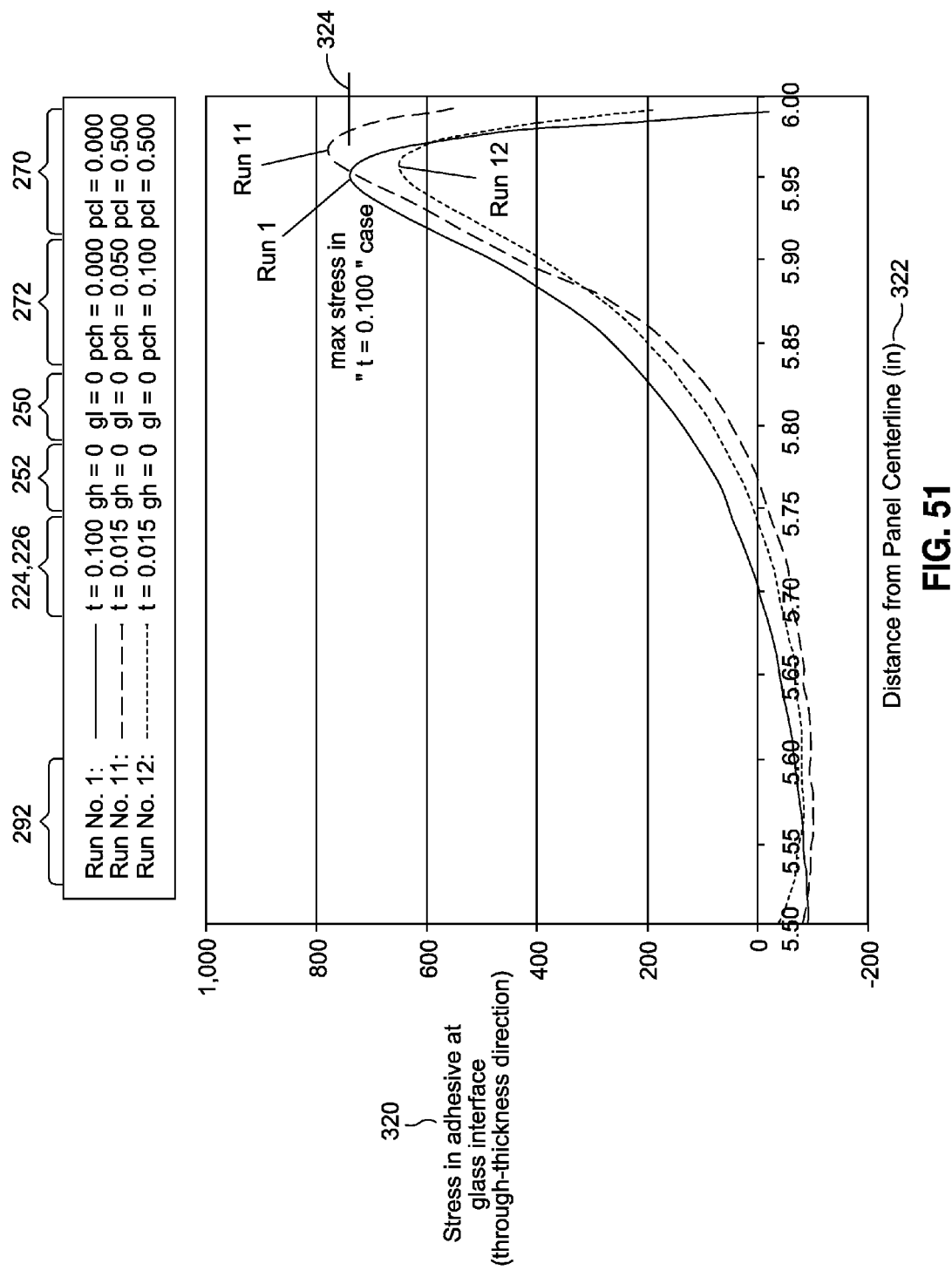

Referring to FIG. 51, shown is a plot of through-thickness stress 320 at the glass-adhesive interface 230 (FIG. 45) for Run Numbers 11 and 12. In Run Numbers 11 and 12, the glass layer 240 (FIG. 45) did not include a chamfer. Instead, the polycarbonate layer 260 (FIG. 45) included a chamfer 268 (FIG. 45) at the noted chamfer height 272 (FIG. 45). For Run Number 11 with a chamfer height 272 of 0.05 inch, the maximum stress 210 (FIG. 45) was approximately equivalent to the maximum stress 210 (FIG. 41) for the constant thickness 224 bondline 222 of 0.100 inch for Run Number 1. Run Number 12 with a chamfer height 272 of 0.100 inch in the polycarbonate layer 260 resulted in a reduction in the stress relative to Run Number 1.

Figure 52:
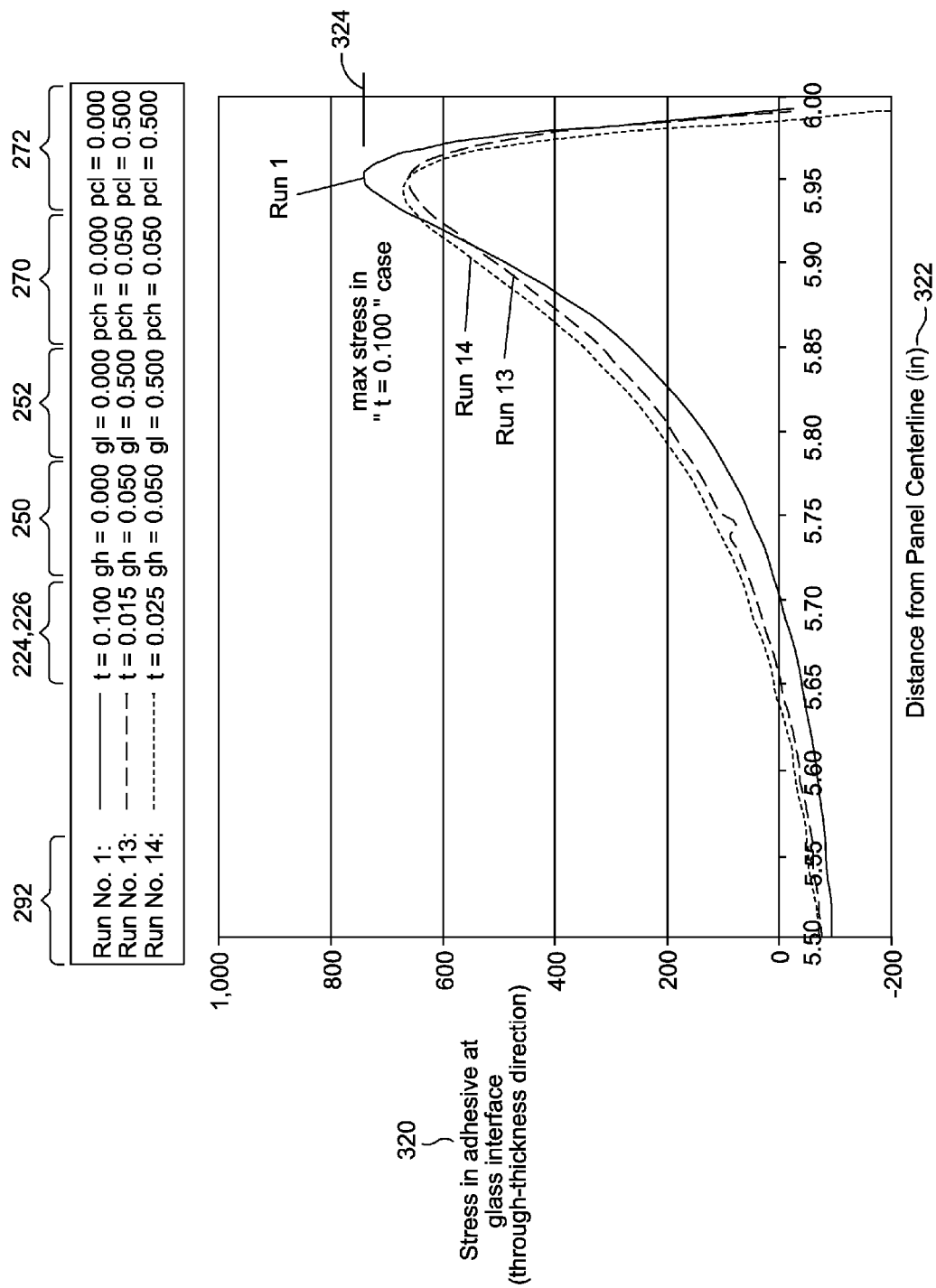

Referring to FIG. 52, shown is a plot of the through-thickness stress 320 at the glass-adhesive interface 230 (FIG. 45) for Run Numbers 13 and 14 wherein both the glass layer 240 (FIG. 45) and the polycarbonate layer 260 (FIG. 45) were chamfered to 0.050 inch for a total chamfer height 252, 272 of 0.100 inch. Run Number 13 had a bondline thickness 224 (FIG. 45) in the main portion 226 (FIG. 45) of the bondline 222 of 0.015 inch. Run Number 14 had a bondline thickness 224 in the main portion 226 of the bondline 222 of 0.025 inch. Run Numbers 13 and 14 had substantially equivalent values for maximum stress 210 (FIG. 45) which may indicate that the thickness 224 of the bondline 222 in the main portion 226 may have a negligible effect on stress when the chamfer height is relatively large. However, as was earlier indicated, an increase in the thickness 224 of the entire bondline 222 (e.g., Run Number 14) may be generally undesirable.

Figure 54:
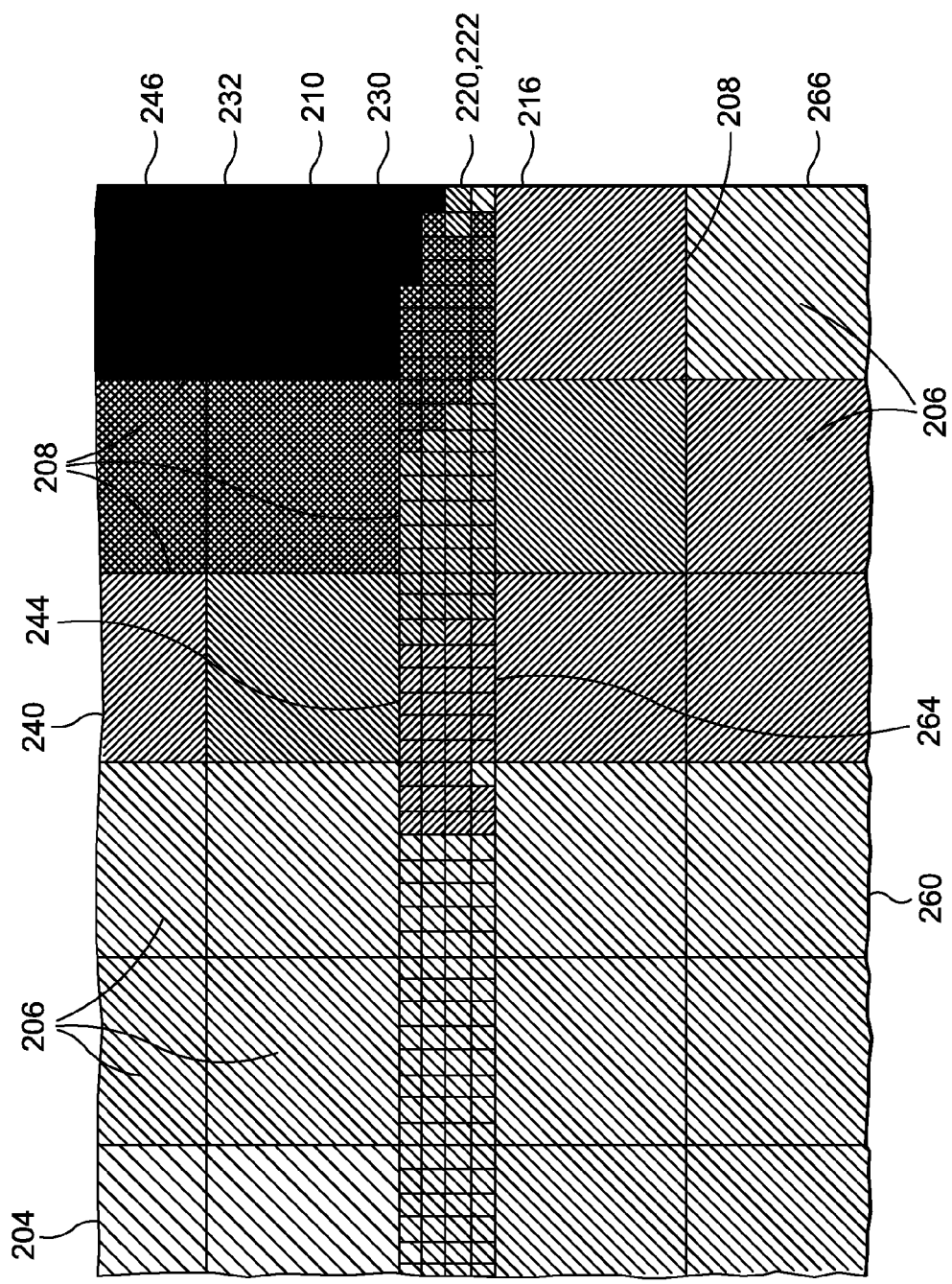
FIG. 54 is an enlarged side view of a side edge of a thermal modeling solution of a panel assembly and illustrating the stress concentration at the corner of the panel assembly.
Figure 53:
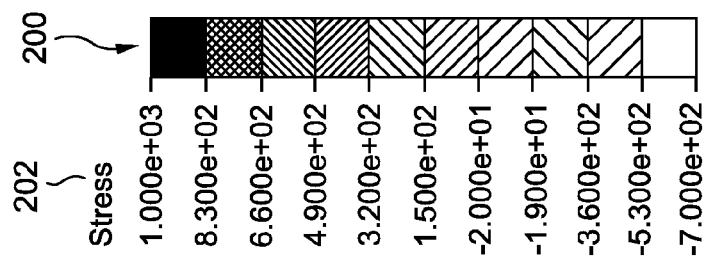
FIG. 53 is a legend of the stress contours and corresponding stress magnitudes corresponding to the thermal modeling solution illustrated in FIG. 54.

Referring to FIGS. 53-54, shown in FIG. 53 is a legend of stress magnitudes corresponding to stress contours illustrated in FIG. 54. FIG. 54 is an enlarged view of a portion of a side edge of a non-rounded corner 216 of a panel assembly 204. As can be seen, the panel assembly 204 has a relatively high magnitude stress concentration at the corner 216. The stress concentration 232 in the corner 216 may be minimized or reduced by providing the corner 216 in a rounded corner 18 configuration such as by applying a radius similar to that which is illustrated in FIG. 6 and described above. In addition, a reduction in the magnitude of the stress and a repositioning of the location of maximum stress 210 inboard of the side edge may be achieved by providing the glass layer 240 and/or the polycarbonate layer 260 with any one of a variety of edge treatment configurations described above.

Figure 55:
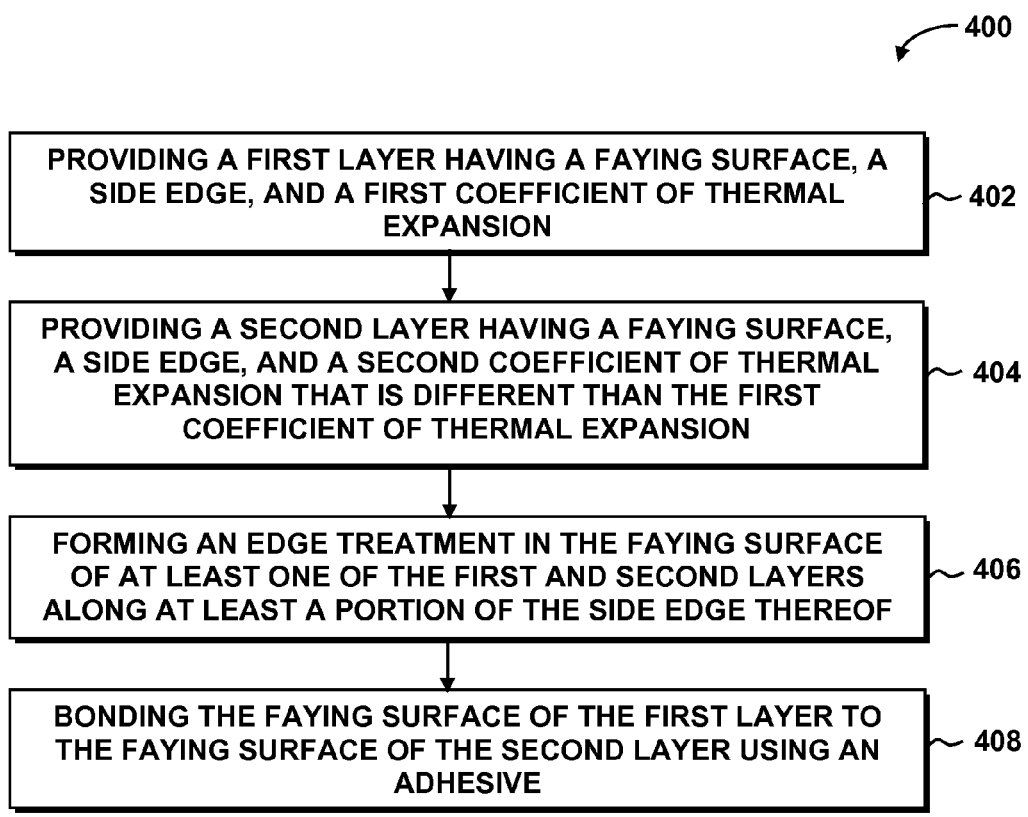
FIG. 55 is a flowchart illustrating one or more operations that may be included in a method for forming a panel assembly having minimized edge stress.

Referring to FIG. 55, shown is a flow chart illustrating one or more operations that may be included in a method 400 for forming a structure 10 (FIG. 1) such as a panel assembly 12 (FIG. 1) having layers with different coefficients of thermal expansion. In this regard, the method 400 may facilitate a reduction or minimization of edge stress in the structure 10. The structure 10 may comprise an assembly of two or more layers such as the assembly of the first layer 40 (FIG. 1) and second layer 60 (FIG. 1) illustrated in FIGS. 1 and 2.

Step 402 of the method 400 of FIG. 55 may include providing the first layer 40 (FIG. 1) with a faying surface 44, a side edge 46, and a first coefficient of thermal expansion. As was indicated above, the first layer 40 may be formed of any suitable material. For example, the first layer 40 may be comprised of a glass material to form a strike face of an armor panel 14 (FIG. 1). However, the first layer 40 may be formed of any material, without limitation.

Step 404 of the method 400 of FIG. 55 may comprise providing a second layer 60 (FIG. 1) having a faying surface 64 (FIG. 1), a side edge 66 (FIG. 1), and a second coefficient of thermal expansion that may be different than the first coefficient of thermal expansion of the first layer 40. The second layer 60 may be formed of any material. For example, the second layer 60 may be formed of polycarbonate material that may be bonded to the first layer 40 which may be formed of glass material. In an embodiment, the first and/or second layer 40, 60 may be formed of any one of a variety of any thermoplastic and/or thermosetting material. The first and/or second layer 40, 60 may be formed as a generally monolithic sheet or layer of material. However, the first layer 40 and/or the second layer 60 may be comprised of a fiber composite which may include a plurality of polymer fiber or glass fibers (not shown) that may be embedded in a matrix (not shown) as was indicated above.

In an embodiment, the first layer 40 (FIG. 1) and/or second layer 60 (FIG. 1) may be substantially optical transparent. However, the first layer 40 and/or the second layer 60 may be formed of substantially opaque material or any variation between transparent and opaque. The structure 10 may comprise at least the first layer 40 and the second layer 60 and may further include one or more additional layers. The structure 10 may be formed in any one of a variety of different configurations, including, but not limited to, a windshield, a canopy, a window, a membrane, an armor panel 14 (FIG. 1), a structural panel, an architectural panel, a non-structural article, and any one of a variety of other configurations.

Step 406 of the method 400 of FIG. 55 may comprise providing an edge treatment 48, 68 (FIG. 1) to the faying surface to the first layer 40 (FIG. 1) or the second layer 60 (FIG. 1). As was indicated above, the edge treatment 48, 68 may be formed along at least a portion of at least one of the side edges 46, 66 (FIG. 1) of at least the first layer 40 or the second layer 60. The edge treatment 48, 68 may be provided in any one of a variety of edge treatment 48, 68 configurations. For example, the edge treatment 48, 68 may be formed as a chamfer 80 (FIG. 6), a double-chamfer 82 (FIG. 7), or as a multiple-chamfer 80 configuration. In addition, the edge treatment 48, 68 may include a rounded edge 84 (FIGS. 8-9) such as a constant radius 86 (FIG. 9) edge, a variable radius 86 edge, or a combination of constant radius 86 and variable radius 86 edge configurations. Even further, the edge treatment 48, 68 may be formed of a combination of a chamfer 80 (FIG. 8) configuration and a rounded edge 84 (FIG. 8) configuration similar to that which is illustrated in FIG. 8 and described above. The edge treatment 48,68 may also be formed in any one of the edge treatment configurations illustrated in FIGS. 10-33 and described above.

Step 408 of the method 400 of FIG. 55 may include bonding the first layer 40 (FIG. 1) to the second layer 60 (FIG. 1) using the adhesive layer 20 (FIG. 1). In this regard, the adhesive layer 20 may form a bondline 22 (FIG. 1) between the first layer 40 and the second layer 60. The bondline 222 may include the main portion 226 (FIG. 1) and the edge treatment portion 28 (FIG. 1). The edge treatment portion 28 may comprise the portion of the adhesive layer 20 filling the gap between the edge treatment 48, 68 (FIG. 1) of one layer and an opposing layer which may or may not include an edge treatment 48, 68. The main portion 26 of the bondline 22 may comprise a portion of the adhesive layer 20 that extending inwardly from the edge treatment portion 28 of the bondline 22. In an embodiment, the bondline 22 may preferably be formed at a thickness 24 that is less than 0.100 inch. As was indicated above, an increase in the bondline thickness 24 above approximately 0.100 inch may have an undesirable effect on the ballistic performance of the panel assembly 12. In a further embodiment, the bondline 22 may preferably be formed at a thickness 24 that is less than approximately 0.050 inch. However, the bondline 22 may be formed at any thickness 24.

In an embodiment, the method of forming a structure 10 (FIG. 1) may include forming the edge treatment 48, 68 (FIG. 1) at a preferred aspect ratio. For example, the method may include forming at least one of the first and second edge treatments 48, 68 at an aspect ratio of edge treatment length 50, 70 (FIG. 1) to edge treatment height 52, 72 (FIG. 1) of no less than approximately 1. However, the edge treatment 48, 68 in any of the layers of the structure 10 may be formed at any aspect ratio, without limitation. As was also discussed above, the edge treatment 48, 68 of any one of the layers of a structure 10 may be provided in any configuration, size, and shape.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A structure, comprising
a first layer having a faying surface, a side edge, and a first coefficient of thermal expansion;
a second layer having a faying surface, a side edge, and a second coefficient of thermal expansion that is different than the first coefficient of thermal expansion;
an adhesive layer between the faying surface of the first layer and the faying surface of the second layer, the adhesive layer defining a bondline having a main portion and an edge treatment portion;
the faying surface of at least one of the first and second layers including an edge treatment extending along at least a portion of a respective one of the side edges, the edge treatment of the at least one of the first and second layers includes a spacer extending toward an opposing one of the first and second layers and supporting the side edge of the at least one of the first and second layers against deflection; and
the edge treatment portion of the bondline corresponding to the edge treatment of the at least one of the first and second layers and being located outside of the main portion and tapering in height from the side edge of the at least one of the first and second layers to the main portion of the bondline.

2. The structure of claim 1 wherein:
the edge treatment comprises at least one of a chamfer and a rounded edge.

3. The structure of claim 1 wherein:
the spacer is configured as a rib spacer extending along at least a portion of a length of the side edge.

4. The structure of claim 1 wherein:
the spacer is configured as a strip spacer formed as a separate component from the first layer and the second layer and extending along at least a portion of a length of at least one of the side edges.

5. The structure of claim 1 wherein:
the spacer comprises a plurality of spacer blocks arranged in spaced relation to one another along at least a portion of a length of the side edges.

6. The structure of claim 5 wherein:
the spacer blocks are configured in a sinusoidal arrangement extending along at least a portion of the length of the side edges.

7. The structure of claim 1 wherein:
the structure includes a corner at an intersection of a pair of the side edges; and
the corner having a generally rounded configuration.

8. The structure of claim 1 wherein:
the bondline in the edge treatment portion being comprised of an adhesive having a material composition that is different than the material composition of the adhesive in the main portion.

9. The structure of claim 1 wherein:
the bondline in the main portion having a thickness of less than approximately 0.100 inch.

10. The structure of claim 1 wherein:
at least one of the first and second layers is substantially optically transparent.

11. The structure of claim 1 wherein:
the adhesive layer is comprised of at least one of the following materials: polyvinyl butyral, polyurethanes, silicones, epoxies, thermosets, and thermoplastics.

12. The structure of claim 1 wherein at least one of the first and second layers is comprised of at least one of the following materials:
glass;
a thermoplastic material comprising at least one of the following: acrylics, fluorocarbons, polyamides, polyethylenes, polyesters, polypropylenes, polycarbonates, polyurethanes, polyetheretherketones, polyetherketoneketones, polyetherimides;
a thermoset comprising at least one of the following: polyurethanes, phenolics, polyimides, bismaleimides, polyesters, epoxy, silsesquioxanes;
inorganic material comprising at least one of the following: carbons, silicon carbide, boron; and
a fiber composite including at least one of polymer fibers and glass fibers at least partially embedded in a matrix.

13. The structure of claim 1 wherein the structure is configured as at least one of the following:
a windshield, a canopy, a window, a membrane, an armor panel, a structural panel, an architectural panel, a non-structural article.

14. A structure, comprising
a substantially optically transparent first layer having a faying surface, a side edge, and a first coefficient of thermal expansion;
a substantially optically transparent second layer having a faying surface, a side edge, and a second coefficient of thermal expansion that is different than the first coefficient of thermal expansion;
an adhesive layer interposed between the faying surface of the first layer and the second layer, the adhesive layer defining a bondline having a main portion and an edge treatment portion; and
the faying surface of at least one of the first and second layers having an edge treatment configured as a chamfer extending along at least a portion of the respective side edge, the chamfer including a rib extending toward an opposing one of the first and second layers and supporting the side edge of the at least one of the first and second layers against deflection; and
the edge treatment portion of the bondline corresponding to the chamfer and being located outside of the main portion and tapering in height from the side edge of the at least one of the first and second layers to the main portion of the bondline.

15. A method of forming a structure, comprising the steps of:
providing a first layer having a faying surface, a side edge, and a first coefficient of thermal expansion, the first layer having an edge treatment in the faying surface along at least a portion of the side edge thereof;
providing a second layer having a faying surface, a side edge, and a second coefficient of thermal expansion that is different than the first coefficient of thermal expansion;
bonding the faying surface of the first layer to the faying surface of the second layer using an adhesive layer;
the adhesive layer defining a bondline having a main portion and an edge treatment portion, the edge treatment portion of the bondline corresponding to the edge treatment of the first layer and being located outside of the main portion, the edge treatment portion of the bondline tapering in height from the side edge of the first layer to the main portion of the bondline; and
the edge treatment of the first layer includes a spacer extending toward the second layer and supporting the side edge of the first layer against deflection.

16. The method of claim 15 further comprising the step of:
forming the bondline in the main portion at a thickness of less than approximately 0.100 inch.

17. The method of claim 15 further comprising the step of:
forming at least one of the first and second layers from substantially optically transparent material.

18. The method of claim 15 further comprising the step of:
forming the adhesive layer from at least one of the following materials:
polyvinyl butyral, polyurethanes, silicones, epoxies, thermosets, and thermoplastics.

19. The method of claim 15 further comprising the step of:
forming at least one of the first and second layers from at least one of the following materials:
glass;
a thermoplastic material comprising at least one of the following: acrylics, fluorocarbons, polyamides, polyethylenes, polyesters, polypropylenes, polycarbonates, polyurethanes, polyetheretherketone, polyetherketoneketone, polyetherimides;
a thermoset comprising at least one of the following: polyurethanes, phenolics, polyimides, bismaleimides, polyesters, epoxy, silsesquioxanes;
inorganic material comprising at least one of the following: carbons, silicon carbide, boron; and a fiber composite including at least one of polymer fibers and glass fibers at least partially embedded in a matrix.

20. The method of claim 15 further comprising the step of: forming the structure in at least one of the following configurations:
a windshield, a canopy, a window, a membrane, an armor panel, a structural panel, an architectural panel, a non-structural article.

21. The method of claim 15 further comprising the step of: providing the second layer with an edge treatment in the faying surface along at least a portion of the side edge thereof.

22. The method of claim 15 further comprising the step of: providing the first layer edge treatment as at least one of a chamfer and a rounded edge.

23. The method of claim 22 wherein the first layer has a thickness, the method further comprising the step of: providing the chamfer with a chamfer height of up to the thickness of the first layer.

* * * * *